United States Patent
Rohm et al.

[11] 3,858,500
[45] Jan. 7, 1975

[54] CITRUS JUICE EXTRACTOR

[75] Inventors: Robert F. Rohm, Fullerton; L. Bruce Alexander, San Marino, both of Calif.

[73] Assignee: Brown International Corporation, Covina, Switzerland

[22] Filed: July 9, 1973

[21] Appl. No.: 377,622

[52] U.S. Cl. .................. 99/504, 99/507, 99/509
[51] Int. Cl. ............................................. A23n 1/02
[58] Field of Search ............ 99/495, 501, 504, 506, 99/507, 509

[56] References Cited
UNITED STATES PATENTS

| | | | |
|---|---|---|---|
| 2,130,610 | 9/1938 | Brown | 99/504 |
| 2,199,876 | 5/1940 | Brown | 99/504 X |
| 2,270,007 | 1/1942 | McKinnis | 99/507 |
| 2,428,157 | 9/1947 | Healy | 99/504 |
| 2,602,479 | 7/1952 | Trainor | 99/504 |
| 2,937,678 | 5/1960 | Fromm et al. | 99/504 |
| 3,183,955 | 5/1965 | James | 99/495 |

*Primary Examiner*—John W. Huckert
*Assistant Examiner*—Charles Gorenstein
*Attorney, Agent, or Firm*—Paul A. Weilein

[57] ABSTRACT

An annular carousel has an inner circumferential series of pairs of cups to hold radially inwardly facing halves of citrus fruit and a rotary reamer assembly inside the inner circumference of the annular carousel in tangential relation thereto and synchroinzed therewith has pairs of radially outwardly extending reamers to cooperate with the pairs of cups. A cup cycle starts with the two cups of each pair facing radially inwardly one above the other. The lower cup is swung upward 90° to a loading position to receive a new fruit and then is swung upward another 90° to close the two cups together to hold the fruit for a bisecting operation. The lower cup is then swung downward to the starting position for the reaming operation. Above each pair of cups is a magazine to hold a plurality of fruit and a fruit is discharged from the bottom of a magazine to the corresponding lower cup at a loading point in the revolution of the carousel. Throughout each entire revolution of the annular carousel, all of the magazines are exposed to the underside of a supply mass of fruit to insure filling of the magazines for maximum production by the apparatus.

57 Claims, 26 Drawing Figures

Patented Jan. 7, 1975

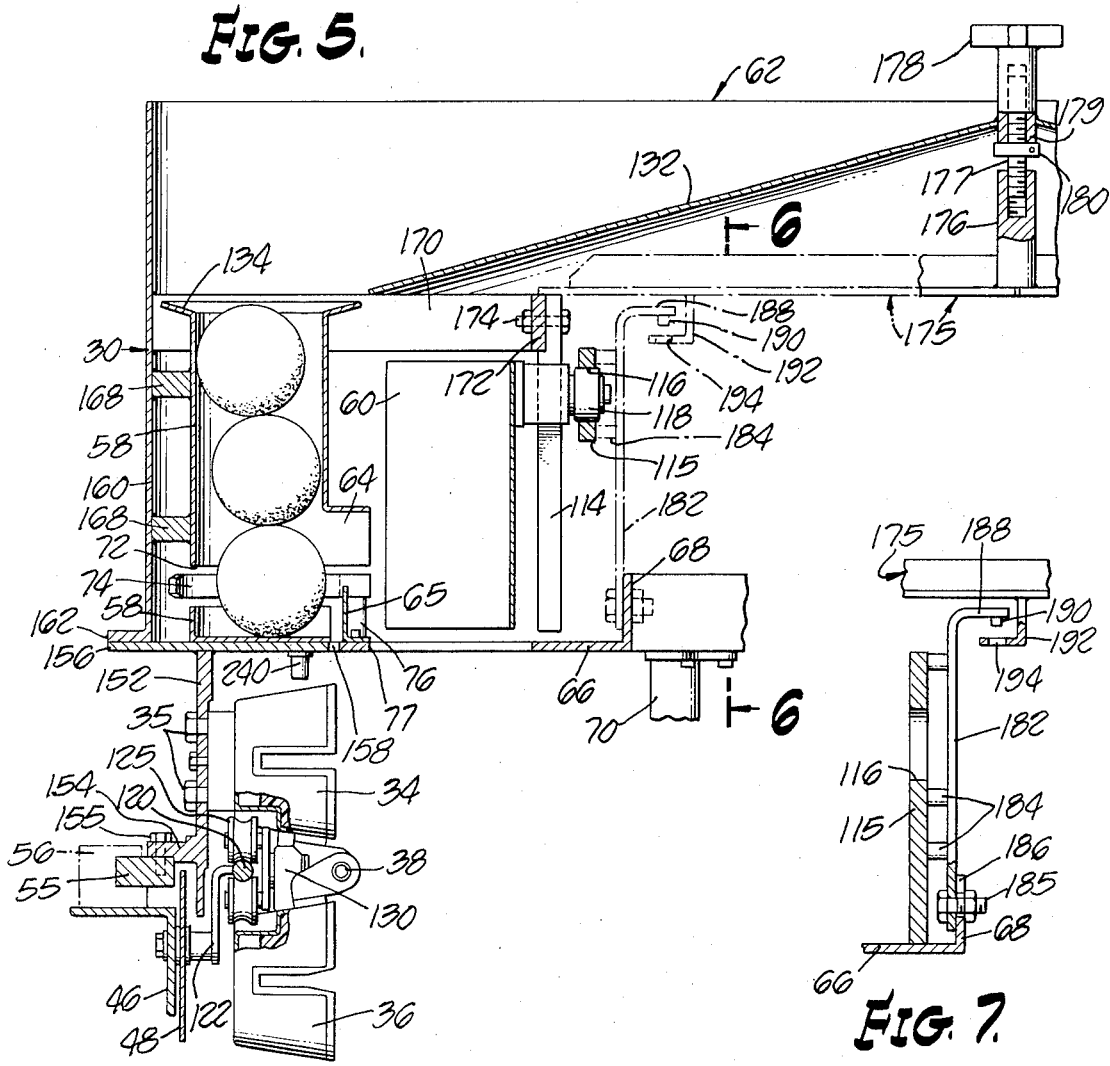
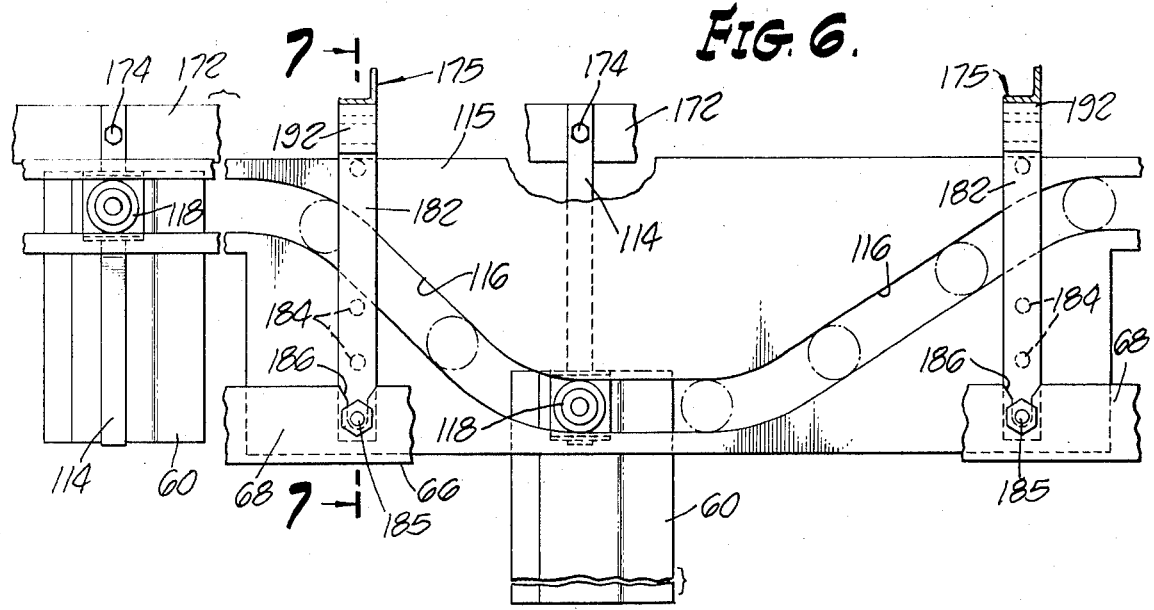

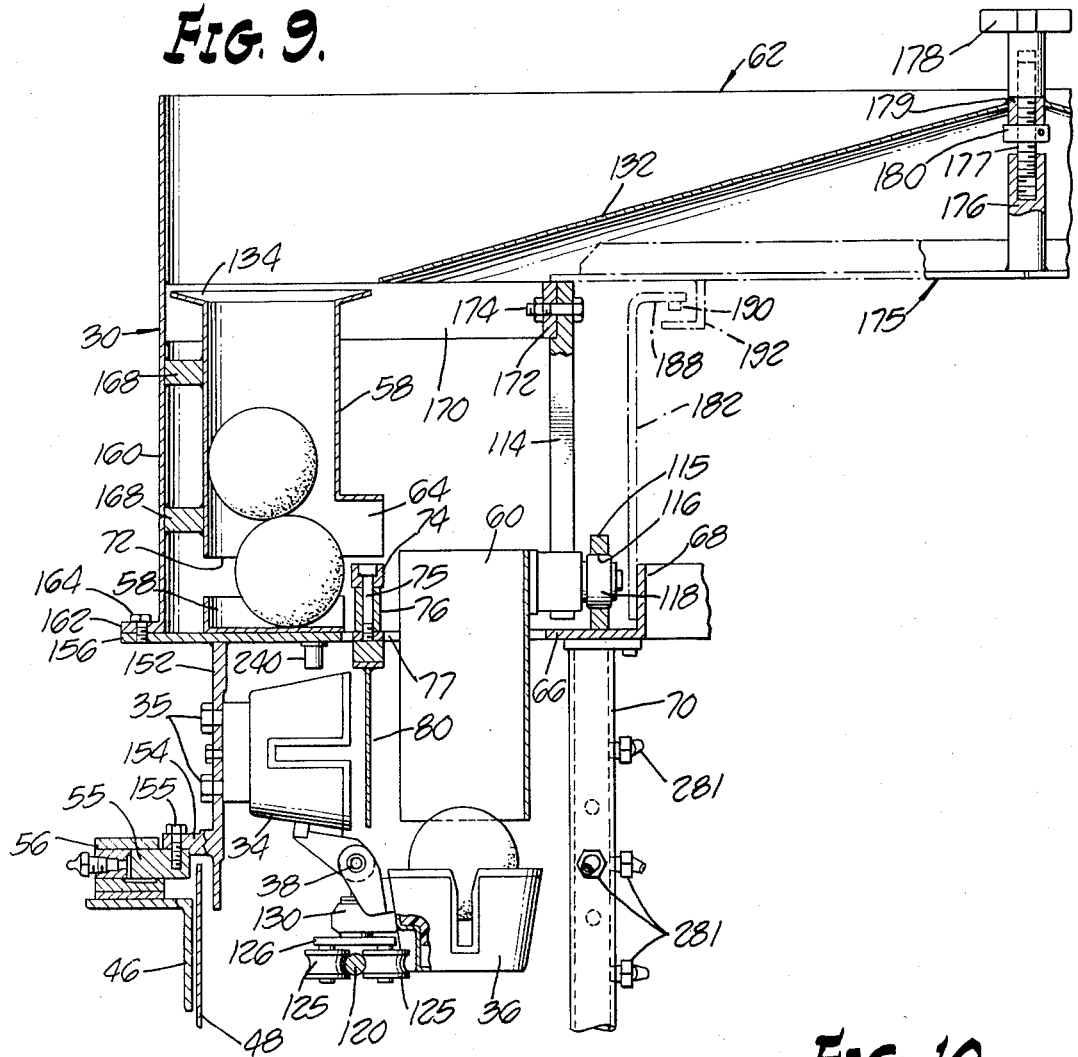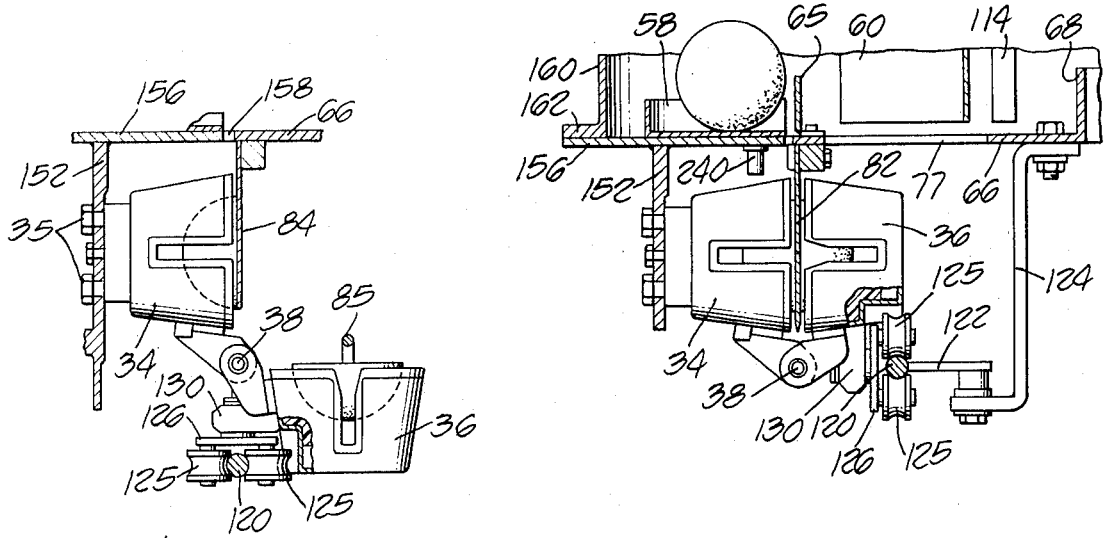

3,858,500

CITRUS JUICE EXTRACTOR

BACKGROUND OF THE INVENTION

One type of prior art apparatus for extracting citrus juice is exemplified by British Pat. No. 957,775 and U.S. Pat. Nos. 2,705,984; 2,848,025; and 2,853,107. In the operation of an apparatus of this particular type a fruit is carried from a hopper into engagement with a stationary knife where the fruit is halved and the fruit halves slide across the knife blade and onto curved divider plates. The halves of fruit then follow separate paths into cups which grasp the fruit halves with the cut faces of the fruit halves downward and carry the fruit halves downward into a reaming zone where rotating reamers enter the fruit. A plurality of the cups are mounted face downward on a horizontal cup carrier which rotates on a vertical axis. Below the cup carrier is a reamer carrier which is mounted to rotate on an inclined axis in synchronism with the cup carrier so that each reamer enters a corresponding cup during a portion of the path of circular travel of the cup. This type of apparatus is characterized by simplicity, reliability and low maintenance cost, but the production rate of 350 per minute is relatively low.

A second type of prior art apparatus is exemplified by U.S. Pat. Nos. 2,631,625; 2,644,568; 3,129,738 and 3,150,700. In this second type of apparatus two coextensive continuous conveyor belts carry cups with the cups of the two conveyors paired, the cups of each conveyor facing the cups of the other conveyor. The paired cups diverge apart in the midregion of the two continuous conveyors and converge together at the opposite ends of the two conveyors. A rotary feeder operating on a horizontal axis receives new fruit from a side hopper and loads the fruit into the pairs of cups just before the cups close together. A knife slices the fruit in the closed pairs of cups at one end of the pair of conveyors and at the other end of the pair of conveyors the two conveyors straddle a reamer assembly that rotates on a horizontal axis and has reamers projecting from its opposite sides to cooperate with the pairs of cups.

This second type of apparatus incorporates both a compressed air system and a complex electrical control system. The compressed air system provides pressure to urge the cups towards the reamers and the electrical control system turns the apparatus off and on so that it does not run without fruit juice to lubricate the cup chains. This second type of apparatus is capable of production rates of around 600 fruit per minute.

It is apparent from the foregoing that there is need for a relatively low cost apparatus that is of relatively simple mechanical construction and is capable of even a higher production rate than the above described second type of apparatus.

The potential production capacity of a juice extractor of this general type is determined by what may be termed the cup rate, i.e., the number of pairs of cups per minute that pass through the reaming zone. The cup rate of the above mentioned second type of apparatus is approximately 750 per minute, but the actual production rate is 600 fruit per minute because as many as 20 percent of the cups may be empty as they approach the reaming zone. It is apparent therefore that there is a pressing need for such an apparatus that will operate with higher occupancy of the cups.

SUMMARY OF THE INVENTION

The objects of the invention include: to provide a relatively simple citrus juice extractor that requires no special skill for maintenance; to provide such a juice extractor that has a high rate of production but nevertheless has a minimum number of moving parts; to provide a citrus juice extractor of the general type wherein the production rate is at least 95 percent of the cup rate; to provide a citrus juice extractor that does not need a compressed air system to put the halves of fruit under compression during the reaming operation; to provide such an apparatus that need not be operated at low voltage to avoid starting shock loads; to provide a citrus juice extractor that does not require a complex electrical control system to reduce the wear on the series of cups in the event that the machine is run dry, i.e., without being lubricated by fruit juice; to provide a high production citrus juice extractor that is compact and yet affords convenient access to all moving parts; to provide a novel supply system including a novel arrangement for feeding new fruit to the carousel; to provide a fruit supply system that incorporates an upright feed magazine positioned above each pair of cups and travelling with the pair, each magazine having a capacity of at least two fruit in a vertical stack; to provide such a feed arrangement in which all of the travelling magazines around the entire circumference of the annular carousel open onto the fruit in the feed hopper throughout each entire revolution of the carousel to afford maximum opportunity for new fruit to enter the travelling magazines; to provide a feed hopper in which fruit is urged towards the travelling magazines by both gravity and centrifugal force; and to provide a compact and efficient driving mechanism for actuating the moving parts wherein the power input is to the rotary reamer assembly and the rotary reamer assembly meshes with the inner circumferential portion of the annular carousel for driving the carousel in accurate synchronism with the reamer assembly.

For the purpose of achieveing these various objects, the apparatus of the invention consists essentially of an annular carousel rotating on a vertical axis and a rotary reamer assembly inside the inner circumference of the carousel, the rotary reamer assembly being in mesh with the surrounding annular carousel in the same manner that a planet gear meshes with a surrounding ring gear. The inner circumference of the annular carousel carries a continuous series of 21 pairs of cups which approach the reamer assembly in parallel rows and the reamer assembly has 14 pairs of radial reamer elements arranged in two rows to cooperate with the pairs of cups.

Each pair of cups on the inner circumference of the annular carousel comprises an upper cup that faces radially inwardly of the carousel and is fixed to the carousel and a lower cup that is hingedly mounted to swing in an arc relative to the upper cup. The cup cycle may be considered as starting with both the upper cup and the lower cup facing radially inwardly of the annular carousel in the manner in which the pairs of cups leave the reaming zone. In the next step in the cup cycle the lower cup swings upward 90° to a horizontal position with its open side upward and at this point a new fruit is dropped into the lower cup. At the next stage in the cycle, the lower cup swings upward another 90° to closed relation to the upper cup to cause the two cups to captivate the newly received fruit. A stationary knife acts between the two travelling cups to cut the fruit into two fruit halves which are seated in the two cups, respectively. The two cups then unfold to their starting positions, the lower cup swinging through an arc of 180° back to its position at which it faces radially inwardly of the annular carousel. Suitable provision is made to retain the halves of fruit in the two cups respectively as the cups separate and as the lower cup swings back to its lower position, the fruit halves being retained in the two cups until the two cups carry the fruit halves to the reaming zone where the reamers enter the cups. As the pairs of cups leave the reaming zone they approach a zone where the reamed skins of the fruit halves are bisected by stationary knife means and are discarded into a peel chute.

A feature of the invention is that the reamer assembly being substantially smaller in diameter than the inside diameter of the surrounding annular carousel defines with the carousel a liberal space that is crescent-shaped in plan and the mechanism for loading the cups with new fruit and for carrying out the cup cycle is provided in this annular space to make the apparatus exceptionally compact. As will be explained, the mechanism for carrying out the cup cycle comprises a circumferentially extending cam rod and each of the lower cups is provided with suitable follower means which travels along the cam rod and by virtue of changes in direction of the cam rod causes the lower cup to swing in the required manner relative to the corresponding upper cup.

The annular carousel has three levels of operation, namely, a lower level where the pairs of cups cooperate with the reamer assembly to extract the fruit juice, an intermediate level occupied by the travelling magazines of the carousel, and an upper feed level occupied by the feed hopper. The feed hopper has a conical bottom wall which rotates with the carousel and which directs fruit gravitationally and centrifugally to the upper open ends of the travelling magazines.

The annular carousel rotates through a loading zone where a fixed cam member displaces a fruit laterally from the bottom of each magazine into a corresponding fruit guide that travels with the magazine. Each fruit guide is of the general character of an upright cylinder with one side of the cylinder removed for the purpose of receiving fruit from the corresponding fruit magazine. As each fruit magazine approaches the loading zone the lower cup of the corresponding pair of cups swings upward to its loading position and at the same time the fruit guide temporarily lowers to guide the new fruit into the upwardly facing lower cup. The fruit guide then immediately withdraws upward into the intermediate level of the carousel to be out of the way during the remainder of the revolution of the carousel.

The loading of new fruit into the cups occurs over approximately 10 percent of one revolution of the carousel; the slicing of the newly received fruit into fruit halves occurs over approximately 5 percent of the revolution; the reaming of the fruit halves occurs over approximately 30 percent of the revolution of the carousel; bisecting and discarding the reamed fruit skins is carried out over approximately 15 percent of the revolution; and the cup cycle is carried out over the approximately 40 percent remainder of the revolution of the carousel.

The features and advantages of the invention may be understood from the following detailed description and the accompanying drawings.

BRIEF DESCRIPTION OF THE DRAWINGS

In the drawings, which are to be regarded as merely illustrative:

FIG. 5 is an enlarged fragmentary sectional view taken along the line 5—5 of FIG. 2 showing the three levels of the carousel;

FIG. 6 is a developed view taken as indicated by the line 6—6 of FIG. 5 and showing the barrel cam that lowers the fruit guides at the loading zone;

FIG. 7 is a fragmentary sectional view taken as indicated by the line 7—7 of FIG. 6 showing how the barrel cam for controlling the fruit guides is supported by fixed structure;

FIG. 9 is a sectional view similar to FIG. 5 showing the lower cup in loading position;

FIG. 10 is a fragmentary sectional view similar to FIG. 9 showing the lower cup cooperating with the upper cup to captivate a fruit;

FIG. 11 is a fragmentary view similar to FIG. 9 showing barrier means that retains a fruit half in the lower cup as the lower cup swings downwardly to its lowermost position;

DESCRIPTION OF THE PREFERRED EMBODIMENT OF THE INVENTION

1. General Arrangement

Figure 3:
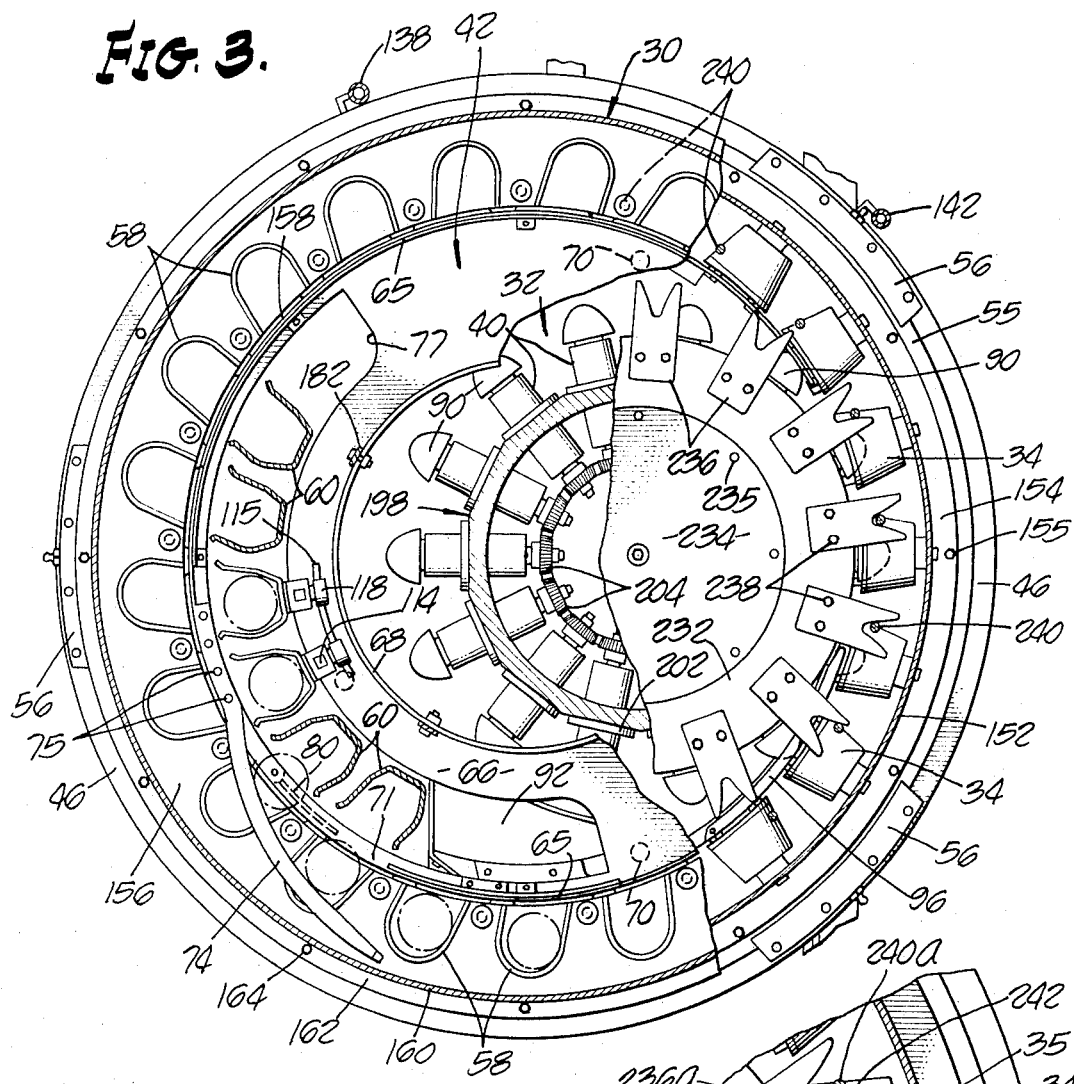
FIG. 3 is a horizontal sectional view as seen along the angular line 3—3 of FIG. 1 showing the lower portions of the magazines at the intermediate level of the carousel and showing how the pairs of cups at the lower level of the carousel cooperate with the rotary reamer assembly for extraction of the fruit juice.
Figure 4:
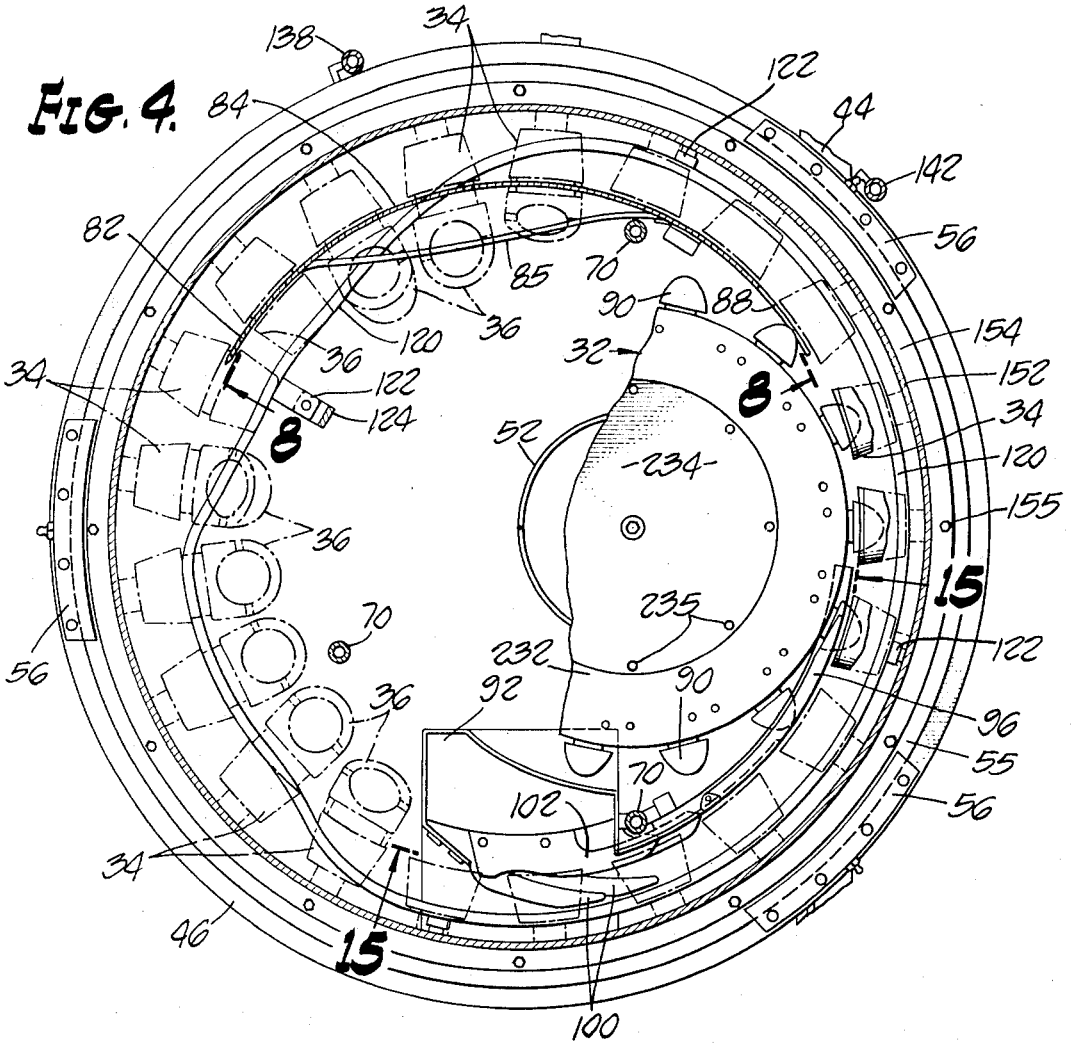
FIG. 4 is a horizontal transverse sectional view as seen along the line 4—4 of FIG. 1 showing various parts of the apparatus that cooperate with the pairs of cups at the lower level of the annular carousel.
Figure 12:
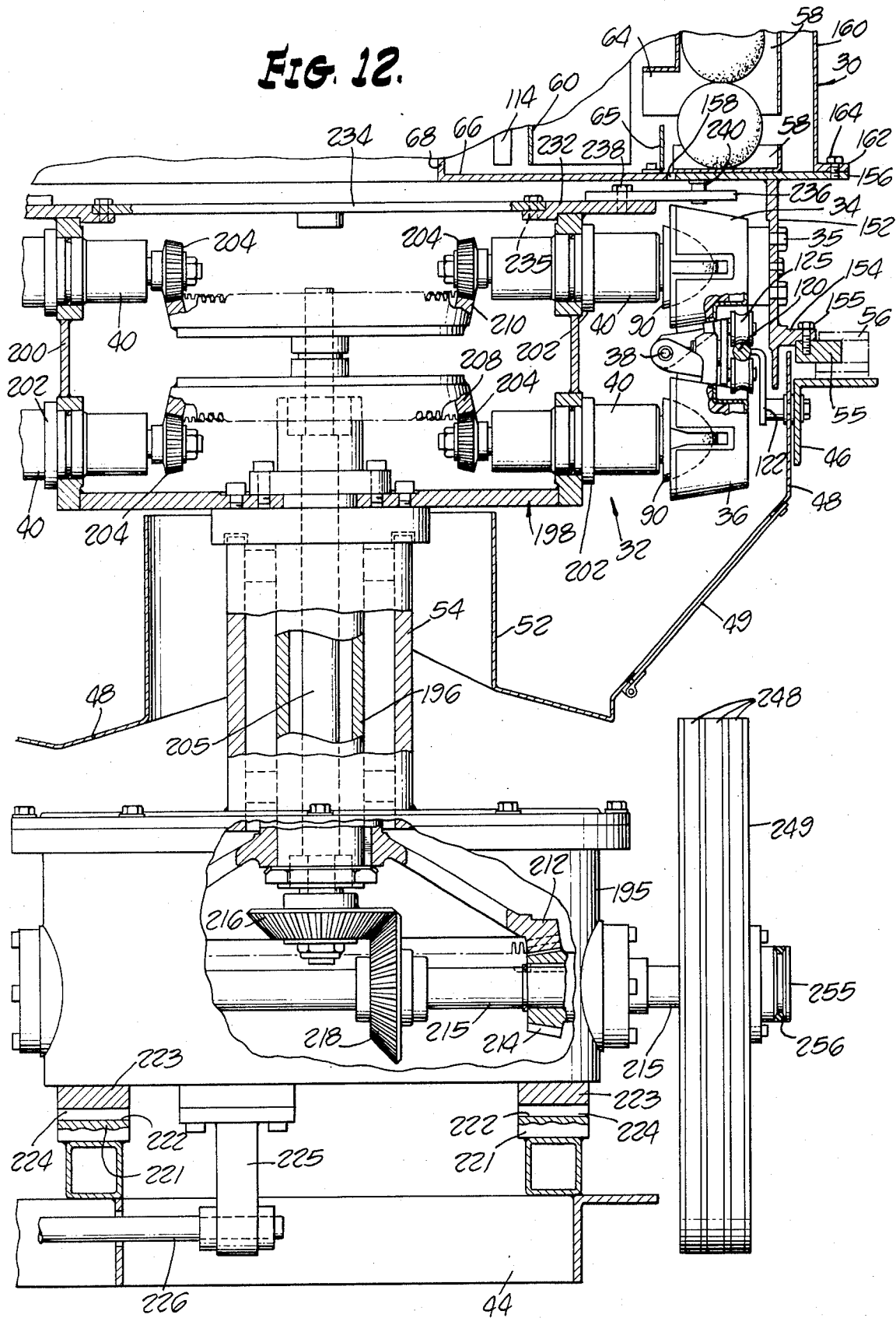
FIG. 12 is a side elevational view of the rotary reamer assembly with parts broken away to show gearing for actuating the rotary reamer assembly and thereby driving the annular carousel.

Referring first to FIG. 3 the principal moving parts of the apparatus comprise an annular rotary carousel, generally designated 30, and a rotary reamer assembly, generally designated 32, which is located within the inner circumference of the annular carousel and mechanically meshes therewith for operation synchronously with the carousel. As shown in FIG. 4, the carousel carries an inner circumferential series of pairs of cups, each pair comprising an upper cup 34 and a lower cup 36. As shown in FIG. 9, the upper cup 34 of each pair is fixedly but removably mounted on the carousel by suitable screws 35 and the corresponding lower cup 36 is pivotally connected to the upper cup by a hinge 38. As shown in FIG. 12 the rotary reamer assembly 32 has an upper circumferential row of reamer units 40 to cooperate with the upper cups 34 of the carousel and has a lower circumferential row of the reamer units to cooperate with the lower cups 36. In the illustrated embodiment of the invention there are 21 pairs of the cups on the inner circumference of the annular carousel 30 and there are 14 pairs of the reamer units 40 on the reamer assembly to cooperate with the pairs of cups.

Since the reamer assembly 32 is positioned inside the inside circumference of the annular carousel and the outside diameter of the reamer assembly is substantially less than the inside diameter of the carousel, the reamer assembly defines with the carousel a space inside the carousel which is generally designated 42 in FIG. 3 and which is crescent-shaped in plan. A feature of the invention which accounts for its compactness is that the crescent-shaped space 42 houses various means to carry out the operating cycle of the apparatus.

Figure 1:
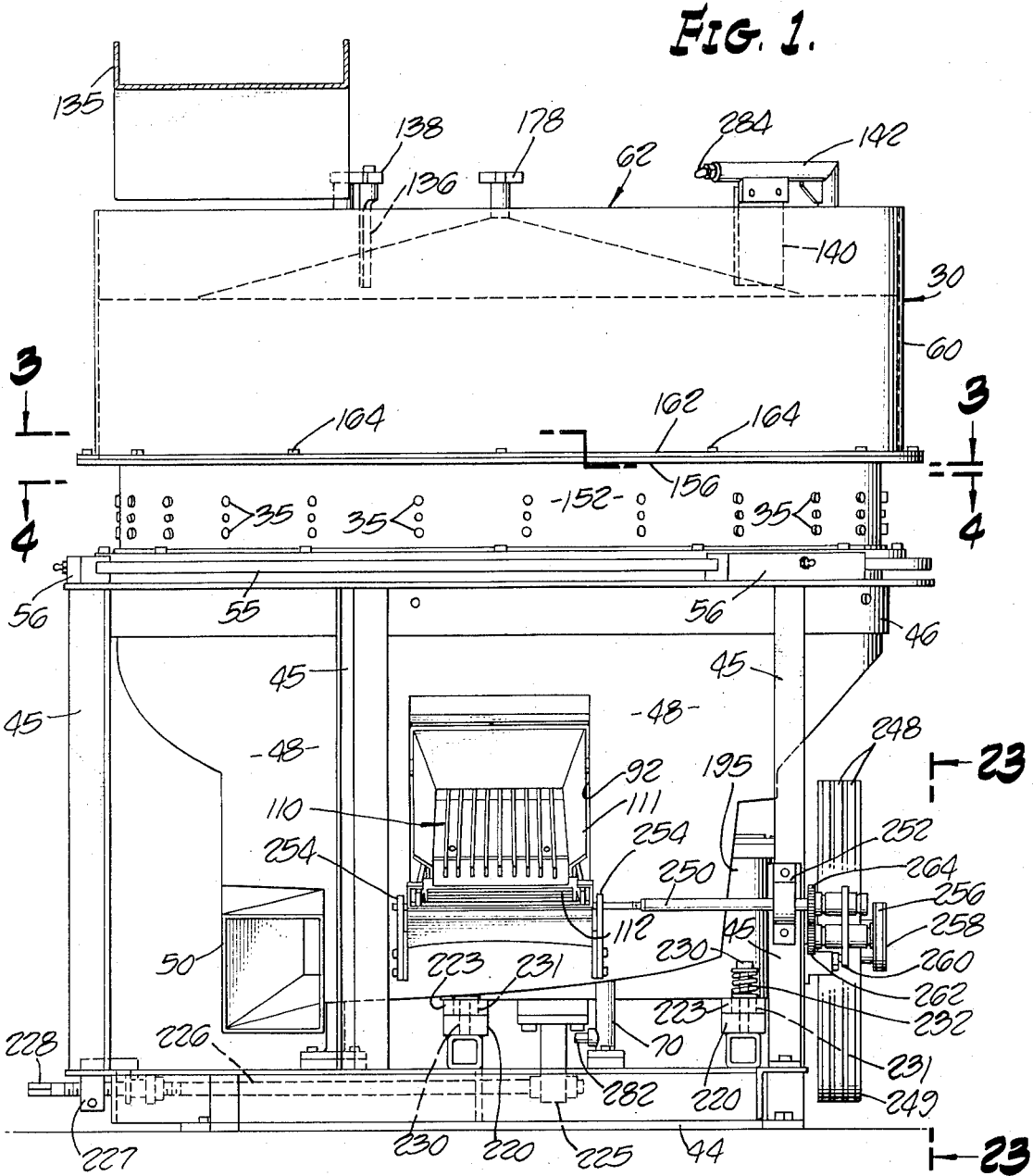
FIG. 1 is a side elevational view of the initial embodiment of the invention.

As indicated in FIG. 1 the fixed support structure of the apparatus includes a base 44 and a plurality of legs 45 that extend upward from the base through an outer circumferential angle iron ring 46. The support structure surrounds and supports a sheet metal pan or bowl 48 that collects the extracted fruit juice and discharges the juice through a spout 50. As shown in FIG. 12 the bowl 48 to collect the extracted fruit juice incorporates an upwardly extending cylindrical wall 52 that surrounds the upright gear case 54 of the rotary reamer assembly 32. The interior of the bowl 48 is accessible through various doors including a door 49 shown in FIG. 12.

As shown in FIGS. 1 and 9 the annular carousel 30 extends above the outer circumferential angle iron ring 46 of the support structure and a polished radial ring 55 which is the base of the annular carousel is slidingly and rotatably supported by three circumferentially spaced bearing shoes 56 which are mounted on the angle iron ring.

Referring to FIG. 5 the annular carousel 30 is divided into three levels, namely, a lower level occupied by the inner circumferential series of pairs of cups 34, 36, an intermediate level occupied by a corresponding circumferential series of upright fruit magazines 58 and associated upright fruit guides 60, and an upper level in the form of a feed hopper 62 of the same outside diameter as the carousel.

Each lower cup 36 is operative through a cycle of positions which may be considered as starting with the lower cup swung downward to its lowest position shown in FIG. 5 where both the upper cup and the lower cup face radially inwardly of the annular carousel as required for presenting halves of fruit to the rotary reamer assembly 32. At the next position in the cup cycle the lower cup 36 is swung 90° upward to the upright loading position shown in FIG. 9 which occurs at a loading zone through which the carousel rotates.

Each of the travelling magazines 58 is of sufficient capacity to hold a plurality of fruit and in this embodiment of the invention is of a capacity to hold at least two fruit in an upright stack as shown in FIG. 5. Each magazine 58 has a lower lateral discharge port 64 where exit of the lowermost fruit is normally blocked by a fixed circumferential baffle 65 which is mounted on a fixed horizontal ring-shaped support plate 66. The ring-shaped support plate 66 has an upstanding inner circumferential flange 68 and is supported by a plurality of tubular legs 70 that extend upward from the base 44. The upper end of one of the legs 70 is shown in FIG. 9 and the lower end of a tubular leg 70 is shown in FIG. 1. The baffle 65 that retains fruit in the travelling magazines 58 is interrupted to form a doorway 71 (FIG. 3) at the beginning of the loading zone to permit the lowermost fruit in a magazine 58 to be discharged through the lateral discharge port 64.

Each of the magazines 58 is divided into two separate sections that form a transverse slot 72 for the purpose of clearing a fixed finger 74 that is positioned in the loading zone to cam the lowermost fruit out of the magazine 58 into the associated fruit guide 60. The fixed finger 74 which is shown in plan in FIG. 3 is mounted by screws 75 on an arcuate support 76 which, as shown in FIG. 9, is fixedly mounted on the outer circumferential edge of the fixed ring-shaped support plate 66. At the loading zone the fixed ring-shaped support plate 66 has an arcuate opening 77 which, as shown in FIG. 3, is of substantial extent circumferentially of the support plate to include both the approach of a fruit guide 60 to the loading zone and the departure of the fruit guide from the loading zone. As a fruit guide 60 approaches the loading zone it is temporarily lowered through the opening 77 to the position shown in FIG. 9 to guide the discharged fruit into the upright lower cup 36. An arcuate baffle 80 extends downward at the loading zone from the outer circumferential edge of the ring-shaped support plate 66 to cover the open side of the upper cup 34 to prevent the gravitating fruit from entering the upper cup. Each of the fruit guides 60 is U-shaped in cross section as may be seen in FIG. 3 with its open side facing the corresponding magazine 58.

A given time period is required for a fruit to gravitate from a magazine to a waiting lower cup and with the carousel rotating at relatively high speed for the required high cup rate a waiting cup travels a given distance in that time period. The corresponding fruit guide 60 stays at its lower position over the given distance of travel of the waiting cup and the arcuate opening 77 in the support plate is accordingly elongate to permit each guide 60 to dwell at its lower position for said given time period.

With the annular carousel rotating clockwise as viewed in plan, the lower cup 36 swings upward 90° from its loading position to an upper position shown in FIG. 10 to cooperate with the upper cup to captivate the newly loaded fruit. The continued rotation of the annular carousel carries the captivated fruit through a slicing zone where a fixed arcuate knife 82 shown in FIGS. 4, 8 and 10 extends between the two cups to slice the fruit into two fruit halves which remain in the two cups, respectively. As a pair of cups travels from the slicing station to the reaming zone for extraction of fruit juice by the rotary reamer assembly 32, the cup 36 swings downward 180° to its starting position as required for cooperation with the reamer assembly and, as will now be explained, suitable retainer means is provided to keep the fruit halves in the two cups until the cups reach the rotary reamer.

Figure 8:
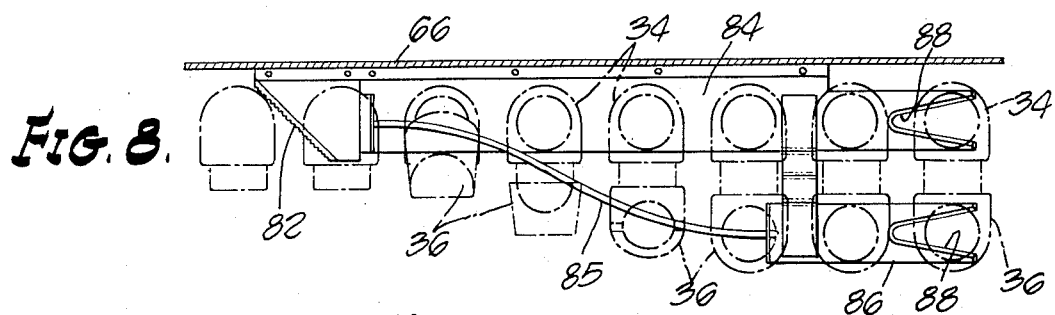
FIG. 8 is a fragmentary sectional view as seen along the arcuate line 8—8 of FIG. 4 showing in side elevation the arcuate knife that slices the fruit into halves and showing retainer means for keeping the fruit halves in the cups until the cups reach the reaming zone.

Referring to FIGS. 4 and 8 the retainer means for cooperation with the upper cups is a fixed arcuate baffle 84 that is continuous with the rear edge of the fixed slicing blade 82. The retainer for keeping fruit in the lower cup as it swings to its lowermost position comprises a fixed rod 85 (FIGS. 4 and 8) that conforms to the resultant of the arcuate travel of a lower cup and the downwardly swinging movement of the lower cup. FIGS. 4 and 11 show how the fixed rod 85 extends across the open side of a lower cup 36 as the travelling cup swings to its lowermost position. The fixed rod 85 leads to a lower fixed baffle 86 shown in FIG. 8 that continues to keep the fruit in the lower cup. Each of the upper and lower retaining baffles 84 and 86 is formed with a V-shaped recess 88 in its trailing end to clear the rotary reamer elements 90 of the reamer assembly as they enter the upper and lower cups to ream the fruit halves therein. The manner in which the reamer elements 90 cooperate with the pairs of cups in the reaming zone is well known in the art and is shown in FIGS. 3, 4 and 12.

The clockwise rotation of the annular carousel carries the pairs of cups 34, 36 from the reaming zone to a peel-ejection zone where the reamed skins of the fruit are discharged into a peel hopper 92 (FIGS. 1 and 16) which is inside the juice collecting bowl 48 and is open to the exterior of the bowl.

Figure 15:
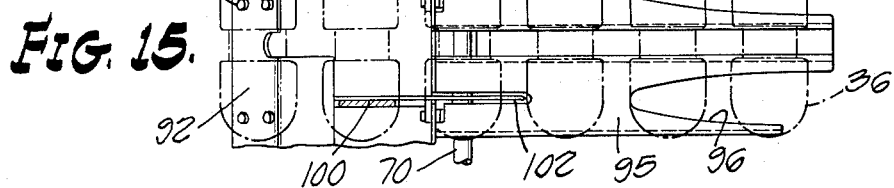
FIG. 15 is a fragmentary elevational view as seen along the arcuate line 15—15 of FIG. 4 showing the knives for bisecting the reamed fruit skins and showing the means for retaining the reamed fruit skins in the cups as the cups travel from the reaming zone to the region of the bisecting knives.
Figure 18:
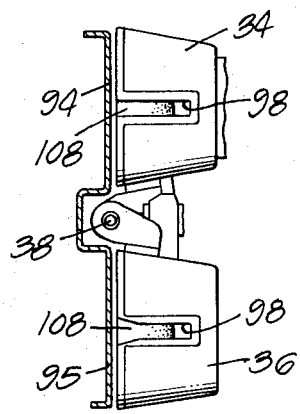
FIG. 18 is a fragmentary vertical section along the line 18—18 of FIG. 17 showing means for retaining the reamed skins of fruit halves in the pairs of cups as the pairs of cups approach the knives that bisect the reamed skins.

To keep the reamed fruit skins in the pairs of cups as they leave the reaming zone, fixed retainer means shown in FIGS. 15 and 18 which comprises an upper arcuate baffle 94 and a lower arcuate baffle 95 cover the open sides of the two cups, the baffles being suspended from the underside of the fixed ring-shaped support plate 66. As shown in FIG. 15 each of the baffles 94, 95 is formed with a V-shaped recess 96 in its leading end to clear the reamer elements 90 as they leave the cups.

Figure 21:
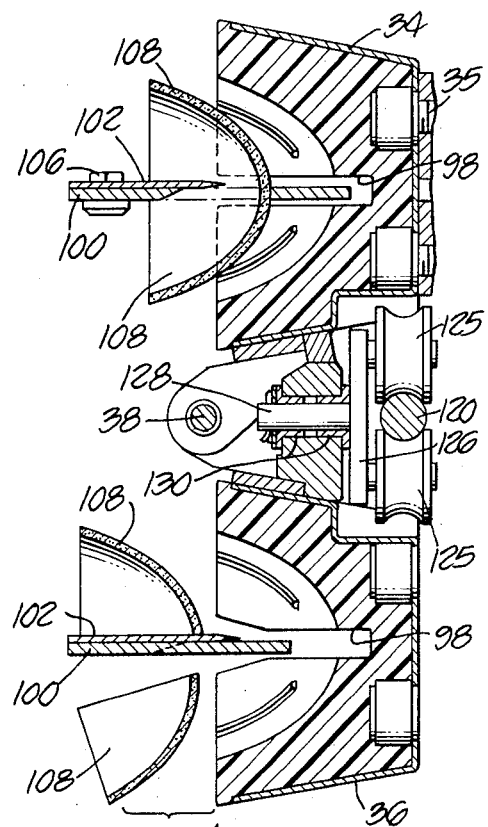
FIG. 21 is an enlarged fragmentary vertical section along the line 21—21 of FIG. 17 showing the bisecting knives and the corresponding fixed cam means.

In a well known manner, each of the cups 34, 36 has an elastomeric liner and as best shown in FIG. 21 each cup has a transverse slot 98, the purpose of which is to clear fixed peel-ejector means at the ejection zone above the peel hopper 92.

Figure 17:
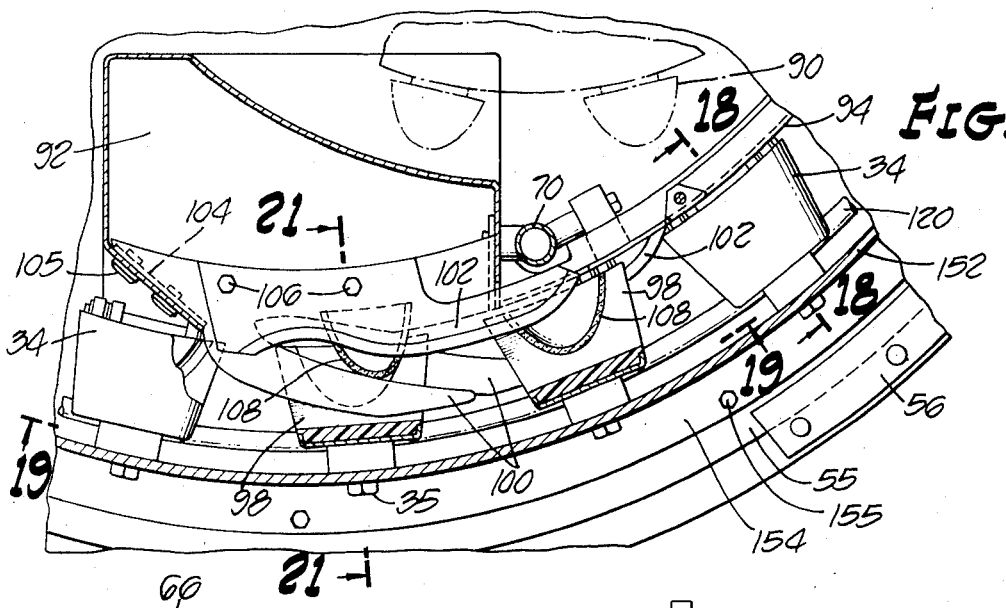
FIG. 17 is a fragmentary horizontal section showing a fixed knife for bisecting a reamed skin of a fruit half in combination with means to cam the bisected fruit skins against the knife and into the peel hopper.
Figure 20:
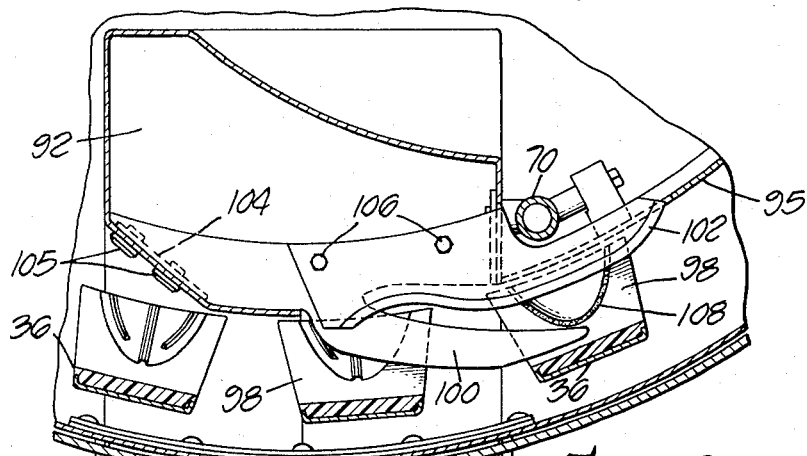
FIG. 20 is a horizontal sectional view as seen along the line 20—20 of FIG. 19 showing how fixed means engages the back of a reamed fruit skin in a cup to cam the fruit skin outwardly of the cup against the associated bisecting knife.

Each of the fixed peel-ejector means comprises an ejector blade 100 and an associated bisecting knife 102 which are best shown in FIGS. 17 and 20. Each of the ejector blades 100 has a base flange 104 which is removably attached to the wall of the peel hopper 92 by suitable screws 105 and each of the bisecting knives 102 is removably mounted on the corresponding ejector blade by screws 106. FIG. 20 shows how an ejector blade 100 contacts the back of a reamed fruit skin 108 to cam it outward against the cutting edge of the associated bisecting knife 102 and FIG. 17 shows a later stage in the outward movement of the reamed fruit skin. As the reamed fruit skin is completely ejected from a cup it is simultaneously bisected by the knife 102 and the bisected reamed fruit skins drop into the peel hopper 92.

Figure 16:
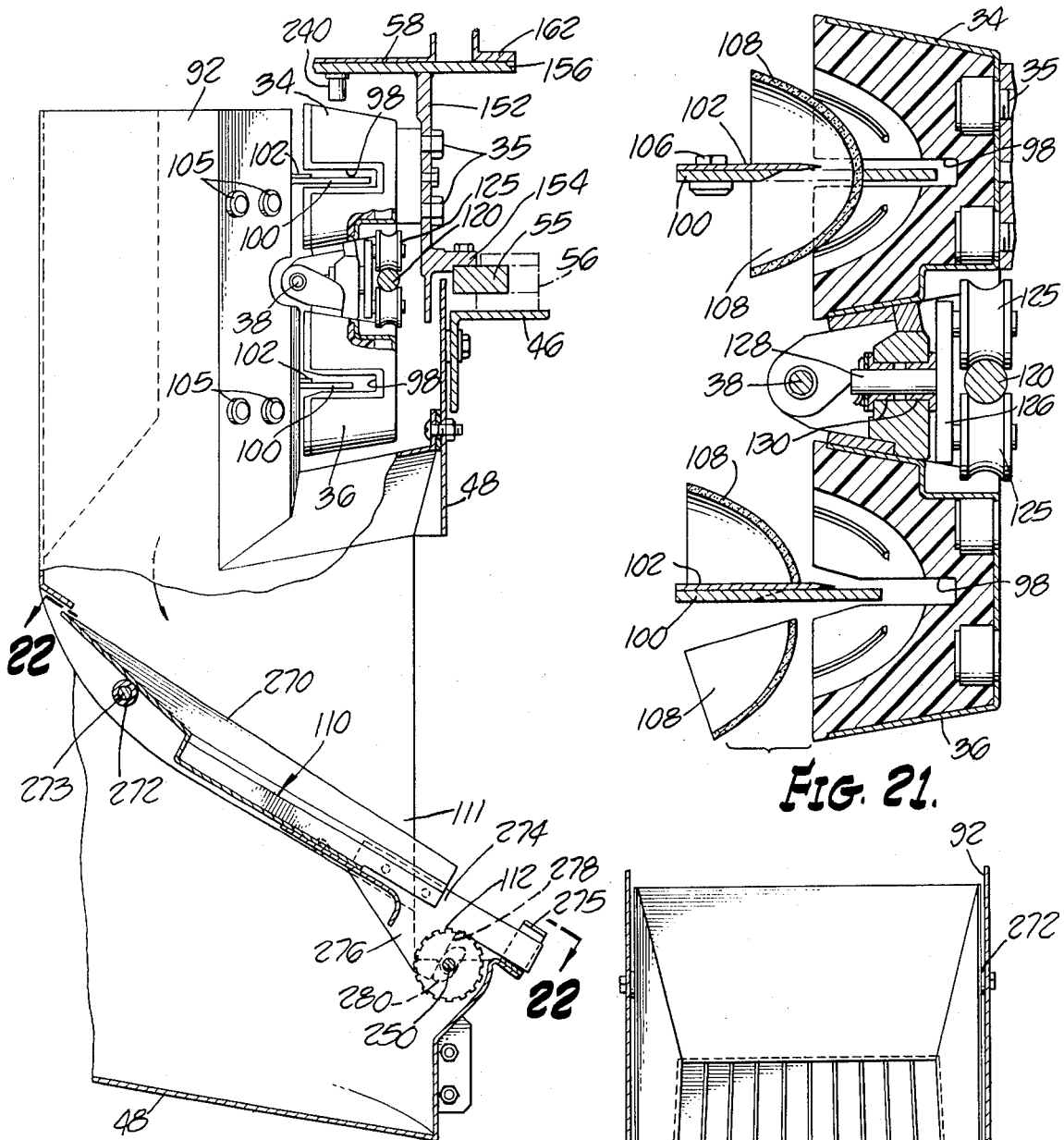
FIG. 16 is a fragmentary vertical sectional view showing the peel hopper for receiving the bisected reamed fruit skins and showing an inclined vibrating grill at the bottom of the peel hopper for directing the bisected fruit skins out of the peel hopper.
Figure 22:
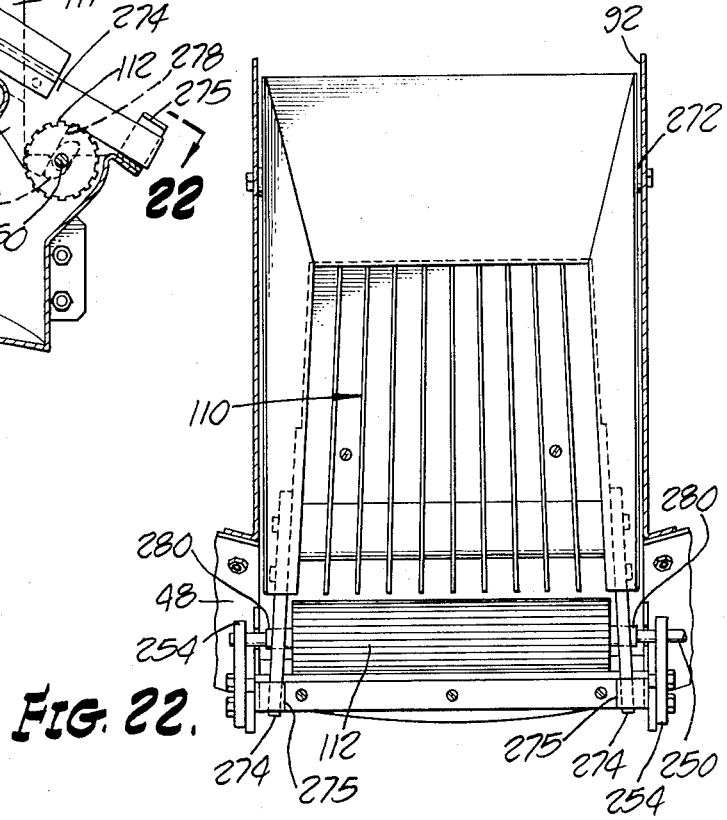
FIG. 22 is a plan view of the oscillating grid at the bottom of the peel hopper as seen along the line 22—22 of FIG. 16.
Figure 19:
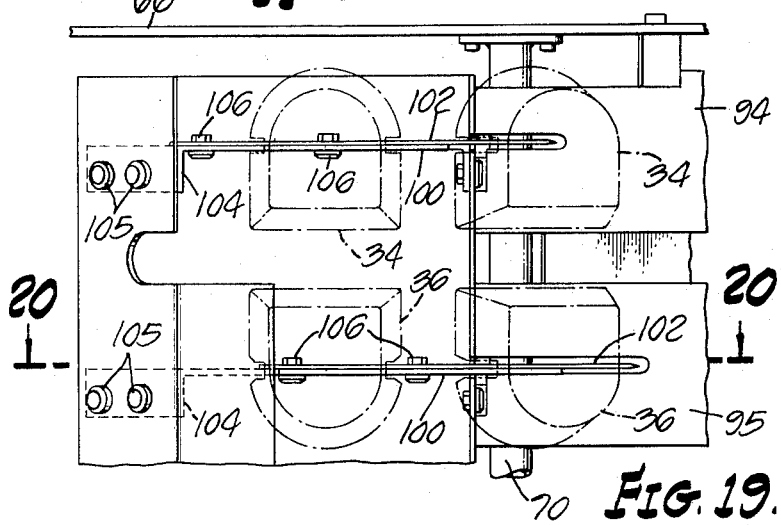
FIG. 19 is an elevational view as seen along the arcuate line 19—19 of FIG. 17 showing the knives for bisecting the reamed skins of fruit halves and the associated means for camming the bisected fruit skins into the peel hopper.

The ejected bisected fruit skins drop on a grill 110 inside the hopper 92 that is shown in FIGS. 1, 16 and 22. The grill 110 is inclined and is suitably agitated to cause the bisected fruit skins to gravitate out of the peel hopper through a window 111 (FIG. 1) to the exterior of the apparatus. A fluted roller 112 extends across the lower end of the inclined grill 110 and rotates in a direction to cause its upper peripheral surface to travel counter to the gravitational movement of the fruit. Free juice-laden membranes of the fruit are caught by the fluted surface of the roller 112 and are discharged back below the grill into the juice collecting bowl 48. In FIGS. 4, 15 and 19 the two ejector blades 100 that cooperate with the upper and lower cups respectively are offset from each other circumferentially of the carousel but it is to be understood that they need not be so offset.

As shown in FIGS. 5 and 9, each of the fruit guides 60 is slidingly mounted on a corresponding vertical guide bar 114 of square cross section that is carried by the annular carousel and the up and down movements of the fruit guides are controlled by a fixed inner circumferential barrel cam 115 which is supported by the previously mentioned ring-shaped support plate 66. As shown in FIG. 6 the barrel cam 115 has a continuous circumferential cam slot 116 that dips in the region of the loading zone and, as shown in FIGS. 5 and 9, each fruit guide 60 is provided with a follower in the form of a roller 118 which traverses the cam slot.

The operating cycle of the lower cups 36 is controlled by a continuous cam rod 120 which is shown in plan in FIG. 4 and which is supported by suitable fixed brackets. One of the brackets designated 122 in FIG. 5 is fixedly mounted on the circumferential angle iron ring 46 and other brackets are fixedly mounted on the underside of the ring-shaped support plate 66 as exemplified by the bracket 124 in FIG. 10.

The lower cups 36 are provided with suitable followers which travel along the cam rod 120. In the construction shown the follower for each lower cup 36 comprises a pair of grooved rollers that grip the cam rod in rolling engagement therewith. As best shown in FIG. 21 the pair of grooved rollers 125 are carried by a yoke 126 that has a shank 128 and the shank is journalled in a bearing 130 that is unitary with the lower cup. The yoke 126 rotates in the bearing 130 to permit the pair of grooved rollers to follow changes in direction of the cam rod 120. The continuous cam rod 120 conforms to the surface of an imaginary ring that is of semicircular cross-sectional configuration, the radius of curvature of the imaginary ring conforming to the radial distance of the grooved rollers from the hinge 38 of the two cups.

Figure 2:
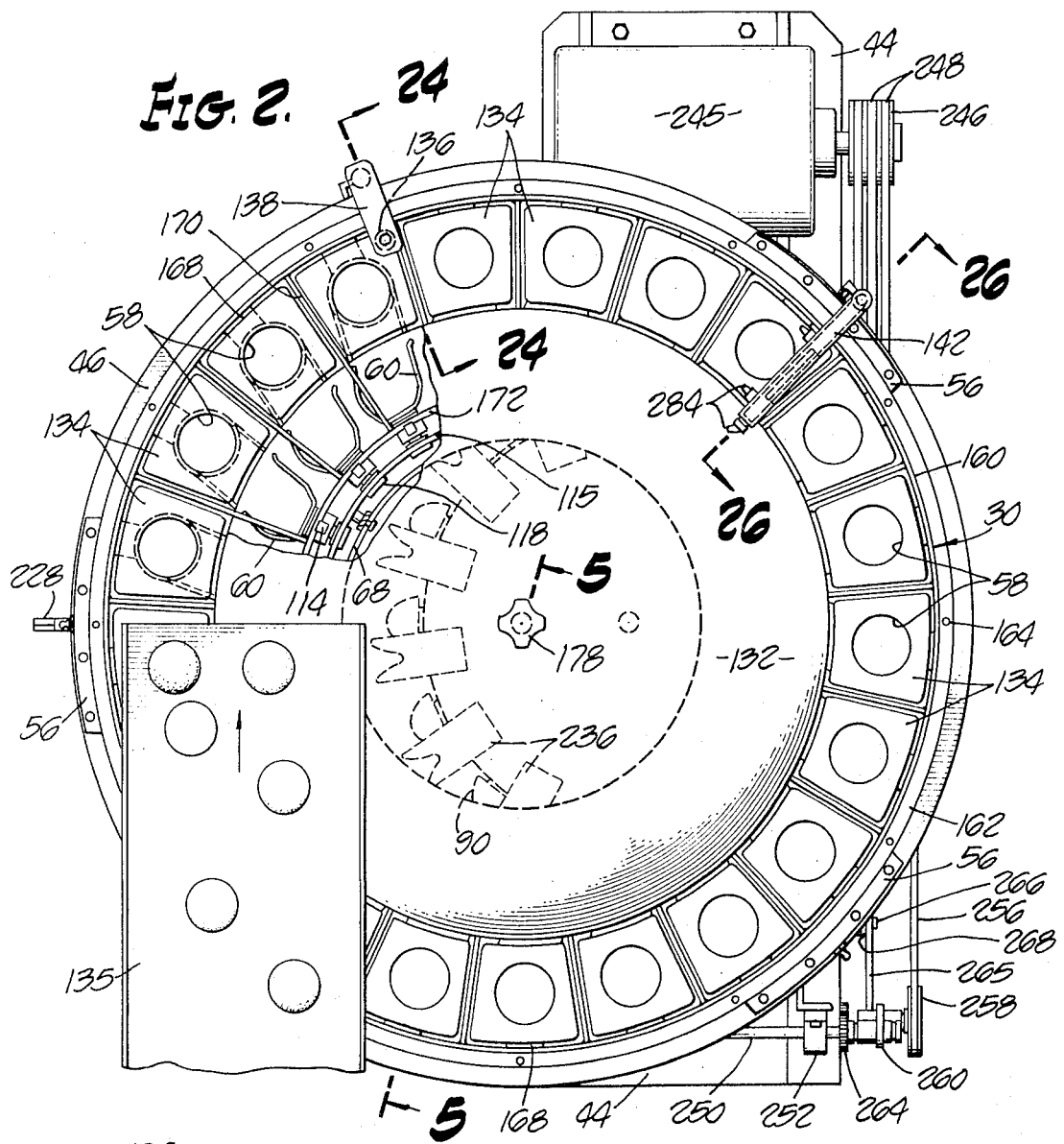
FIG. 2 is a plan view of the apparatus showing the feed hopper at the upper level of the carousel and showing the upper open ends of the travelling magazines that occupy the intermediate level of the carousel.

The feed hopper 62 rotates with the annular carousel and has a conical bottom wall which slopes radially downwardly towards the travelling magazines 58 so that fruit is continuously urged towards the travelling magazines by both gravity and centrifugal force. As shown in section in FIGS. 5 and 9, the upper end of each magazine 58 has a flared entrance flange 134 and as shown in plan view in FIG. 2 the entrance flanges are close enough together and close enough to the periphery of the hopper bottom wall 132 to keep from trapping the fruit so that the fruit may freely move into the upper ends of the fruit magazines. A suitable overhanging chute 135 shown in FIGS. 1 and 2 is intended to keep the feed hopper continuously replenished. Since the fruit magazines 58 are exposed to available fruit throughout the entire revolution of the annular carousel and since each magazine holds a plurality of fruit in an upright row, it is apparent that so long as the hopper is amply replenished there is only a remote possibility that any magazine 58 is empty as it approaches the loading station.

The fruit in the hopper 62 tends to travel with the entrance flanges 134 of the magazines but suitable means is provided in the path of the travelling fruit to agitate and divert the travelling fruit to encourage the travelling fruit to enter the magazines. For this purpose a downwardly extending finger 136 (FIGS. 1 and 24) is mounted on an overhanging bracket 138 (FIGS. 1, 2 and 24) near the outer circumference of the hopper and a radially positioned blade 140 (FIG. 26) is mounted on an overhanging bracket 142 above the travelling magazines to impede any fruit that tends to travel on the forward entrance flanges 134 of the magazines 58 thereby to encourage the travelling fruit to drop into the fruit magazines.

Figure 24:
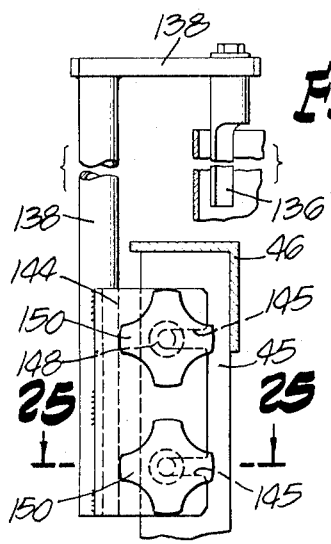
FIG. 24 is a fragmentary section along the line 24—24 of FIG. 2 showing means for diverting fruit from the feed hopper into the travelling magazines.
Figure 25:
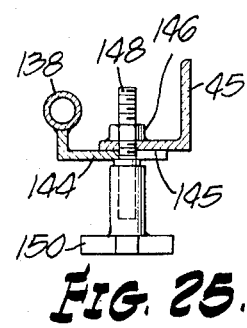
FIG. 25 is a fragmentary section along the line 25—25 of FIG. 24.

FIGS. 24 and 25 show how the bracket 138 may be mounted on the apparatus in a releasable manner for removal whenever it is desirable to remove the feed hopper 62. The bracket 138 is welded to a base plate 144 which is formed with two parallel lateral slots 145.

Figure 26:
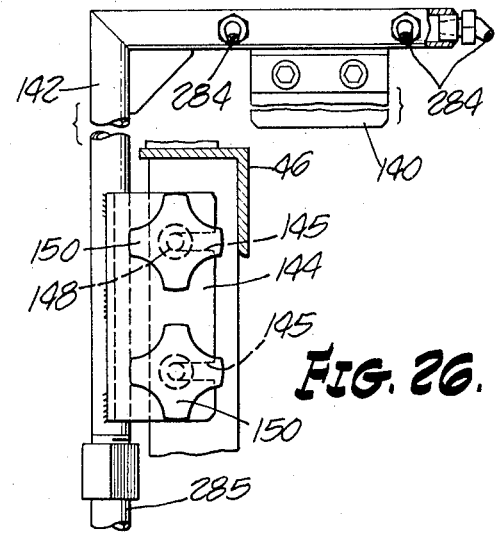
FIG. 26 is a fragmentary sectional view along the line 26—26 of FIG. 2 showing a second means for cooperation with the feed hopper to divert fruit into the travelling magazines.

A nut 146 is welded onto one of the angle iron legs 45 of the apparatus opposite each of the two slots and a manually operable screw 148 with a handle 150 extends through each slot and through the web of the angle iron leg into screw-threaded engagement with the nut. The two screws 148 may be loosened temporarily whenever desired for removal of the bracket 138. As shown in FIG. 26 the bracket 142 carrying the blade 140 is releasable in the same manner, the bracket being welded to a base plate 144 having two slots 145 to receive two correspondingly manually operable screws 148.

As shown in FIGS. 1 and 9 the lower level of the annular carousel has a circumferential wall 152 to which the upper cups 34 are attached and this wall has an outer radial flange 154 to receive screws 155 by means of which the carousel is removably mounted on the previously mentioned polished ring 55. The circumferential wall 152 is welded at its upper end to a horizontal ring-shaped plate 156 of the carousel at the second level of the carousel. The inner circumferential edge of the ring-shaped plate 156 of the carousel confronts the outer circumferential edge of the previously mentioned stationary ring-shaped support plate 66, the confronting edges forming a circumferential gap 158.

Above the ring-shaped plate 156 of the carousel, an outer circumferential wall 160 of the upper two levels of the carousel is formed with a radial flange 162 at its bottom to receive circumferentially spaced cap screws 164 by means of which the outer circumferential wall is removably mounted on the ring-shaped plate 156 of the carousel. The lower sections of the magazines 58 below the transverse slots 72 of the magazines are fixedly mounted on the ring-shaped plate 156 of the carousel. The upper sections of the magazines 58 are attached to the circumferential wall 160 of the carousel by corresponding spacer blocks 168. Above the spacer blocks 168 radial spokes 170 extending inwardly from the circumferential wall 160 carry an inner circumferential ring 172 of the carousel on which the previously mentioned vertical guide bars 114 are mounted by screws 174.

The inner circumferential ring 172 of the carousel supports a spider 175 having angle iron legs, which in turn supports the conical bottom wall 132 of the feed hopper 62. An axial post 176 of the spider 175 is bored and tapped to receive a screw 177 that is manually operable by a knob 178. The screw 177 is freely rotatable in a short sleeve 179 that is unitary with the conical hopper wall 132, the screw carrying a collar 180 to prevent disengagement of the screw from the short sleeve. The screw 177 may be manually loosened by the knob 178 to release the conical hopper wall 132 from the spider 175.

A feature of the described construction of the annular carousel is that the circumferential series of screws 164 may be removed to permit removal of the upper two levels of the carousel for free access to the interior of the apparatus. For this purpose it is necessary that the fixed concentric cam 115 that controls the fruit guides 60 be removable along with the two upper levels of the carousel. In the construction shown, the fixed concentric cam 115 is fixedly attached to circumferentially spaced upright hangers 182 by spacer sleeves 184 and as shown in FIGS. 6 and 7 the lower ends of the hangers are provided with screws 185 that seat in corresponding slots 186 in the upstanding flange 68 of the fixed ring-shaped support plate 66. The screws 185 may be tightened to fixedly secure the concentric cam 115. The conical bottom wall 132 of the hopper may be removed for access to the screws 185 for loosening of the screws when the upper two levels of the carousel are to be removed for access to the interior of the apparatus.

The hangers 182 are formed with bent upper ends 188 that carry downwardly directed lugs 190 and the spider 175 carries corresponding angular brackets 192 that have apertures 194 to receive the lugs. During operation of the apparatus the upper bent ends 188 of the brackets 182 are out of engagement with the angular brackets 192 but with the screws 185 loosened, lifting the upper two levels of the carousel for removal results in the angular brackets 192 engaging the hangers 182 to lift the concentric cam 115 free from the inner circumferential flange 68 of the fixed ring-shaped support plate 66.

The construction of the rotary reamer assembly 32 is shown in FIGS. 3, 4 and 12–14. Referring to FIG. 12 the previously mentioned upright gear case 54 is supported by a lower circular gear case 195 which is mounted on the base structure 44 of the apparatus. An upright tubular shaft 196 is suitably journalled in the upright gear case 54 and carries at its upper end a rotary gear casing 198 which constitutes the head of the reamer assembly. The head of the rotary reamer assembly has an outer circumferential wall 200 in which two rows of the reamer units are removably mounted. The reamer units 40 are cylindrical and have circumferential flanges 202 to receive suitable screws for removably securing the cartridges. Each cartridge has a rotary reamer element or head 90 on its outer end which is unitary with a corresponding pinion 204 on its inner end.

Suitably journalled in the tubular shaft 196 is an upright axial shaft 205 which extends into the rotary reamer head 198 and carries therein a downwardly facing gear 208 in mesh with the pinions 204 of the lower row of reamer units 40 and an upwardly facing gear 210 that meshes with the pinions 204 of the upper row of reamer units. The lower end of the outer tubular shaft 196 carries a downwardly facing gear 212 that meshes with a bevelled gear 214 on a transverse drive shaft 215 and a downwardly facing bevelled gear 216 on the lower end of the axial shaft 205 meshes with bevelled gear 218 on the transverse drive shaft 215. It is apparent that this arrangement will rotate the head of the reamer assembly and will independently actuate the two rows of reamer units 40.

Figure 23:
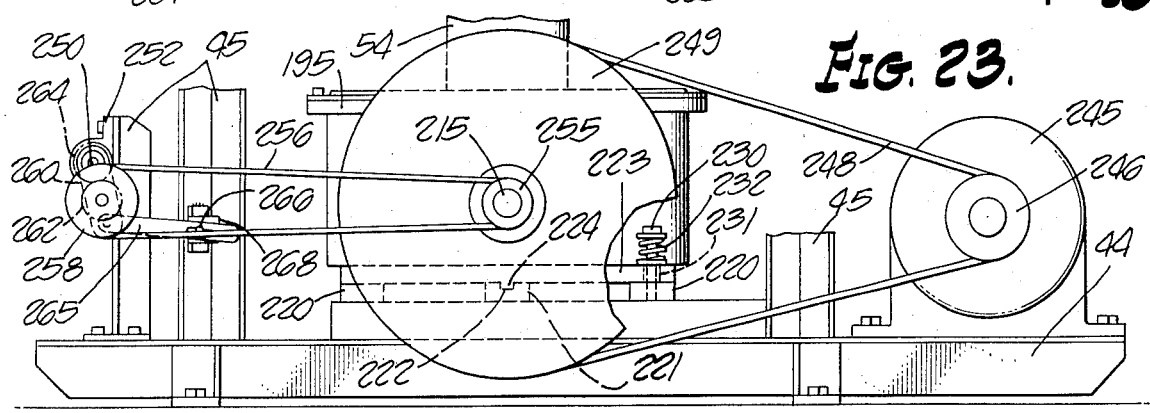
FIG. 23 is a fragmentary elevational view as seen along the line 23—23 of FIG. 1 showing the power-actuated drive for the apparatus.

The reamer assembly is movably mounted on the base structure 44 in a suitable manner that permits adjustment of the assembly radially of the surrounding annular carousel to vary the clearance between the reamer elements 90 and the cups on the carousel to accommodate different fruit skin thicknesses. Referring to FIGS. 1, 12 and 23, the reamer assembly slidingly rests on four fixed pads 220 of the base structure which are located at points that define a rectangle. To guide the adjustment of the reamer assembly along a radius of the annular carousel two additional spaced fixed pads 221 under the reamer assembly have guide grooves 222 aligned with the radius and fixed to the underside of the reamer assembly are two parallel bars 223 that have aligned guide keys 224 in sliding engagement with the guide grooves 222.

A bracket 225 extending downward from the reamer assembly is connected to a radially extending adjustment rod 226 which, as shown in FIG. 1, is screw threaded at its outer end and extends through a fixed nut 227 on the base structure 44. The outer end of the adjustment rod 226 is formed with flats 228 for engagement by a wrench.

In the assembly shown, the two parallel bars 223 fixed to the reamer assembly rest on the four fixed pads 220, each end of each bar resting on a fixed pad. Each of the four pads 220 is provided with a screw 230 that extends upward through a corresponding slot 231 in the corresponding bar 223, which slot is parallel with the guide keys 224 and is long enough to keep from interfering with the movement of the guide keys in the guide grooves 222. Each of the four screws is embraced by a coiled compression spring 232 so that the screws may be tightened to anchor the reamer assembly at various positions to which it may be adjusted.

Figure 14:
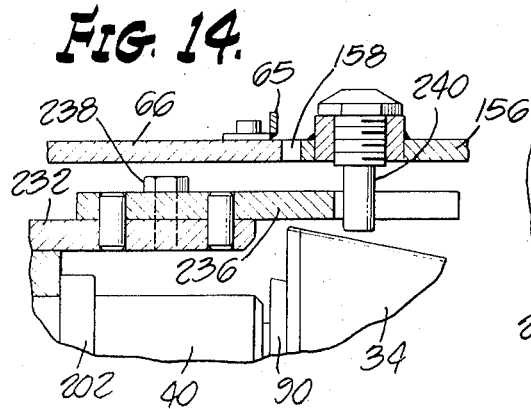
FIG. 14 is an enlarged fragmentary sectional view taken along the line 14—14 of FIG. 13 showing how the rotary reamer assembly meshes with the annular carousel to drive the carousel.
Figure 13:
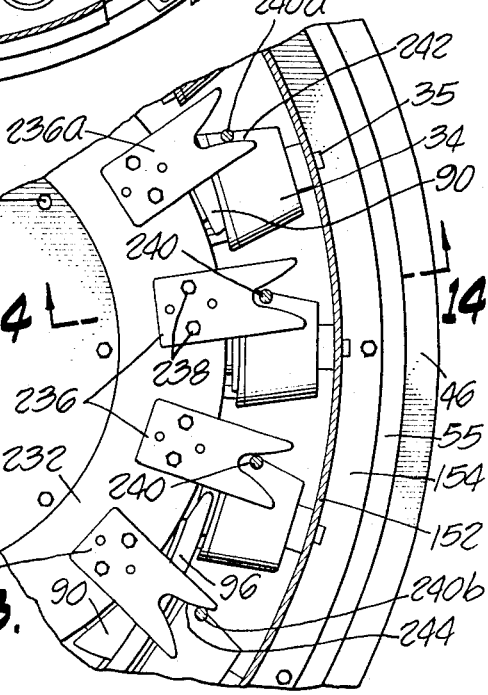
FIG. 13 is an enlarged portion of FIG. 3.

As shown in FIG. 4, the top wall of the reamer assembly comprises an outer ring-shaped plate 232 and a central disc 234 that is anchored by screws 235 and may be removed for access to the interior of the rotary gear case 198. As best shown in FIG. 13, a circumferential series of fork members 236 are mounted on the top of the reamer assembly by pairs of screws 238 for successive engagement with studs 240 on the bottom of the annular carousel to actuate the carousel. As shown in FIG. 14 the studs 240 may be screw threaded for removal and replacement.

A feature of the invention is that at all times two of the fork members 236 engage two of the studs 240 from opposite sides of the studs to minimize backlash. Thus, FIG. 13 shows an inner side surface 242 of a fork member 236a engaging one side of a stud 240a and show another fork member 236b with its opposite inner side surface 244 in contact with the opposite side of another stud 240b.

A further feature of the invention is that the fork members 236 are shaped as indicated in FIG. 13 to engage the studs 240 throughout the range of adjustment of the reamer assembly relative to the carousel with effectiveness against backlash throughout the range of adjustment.

As shown in FIG. 23 the apparatus is actuated by a motor 245, a drive sheave 246 of the motor being connected by belt means 248 with a larger sheave 249 on the drive shaft 215. Since the belt means 248 is perpendicular to the direction of adjustment of the reamer assembly relative to the carousel it does not interfere with the adjustment.

The previously mentioned fluted roller 112 in the peel hopper 92 (FIGS. 16 and 22) is mounted on a countershaft 250 which is journalled in a bearing 252 (FIG. 1) on an angle iron leg 45 of the support structure and as shown in FIG. 22 the shaft 250 is also journalled in fixed arms 254 adjacent opposite ends of the fluted roller.

For actuation of the fluted roller 112 a sheave 255 on the previously mentioned drive shaft 215 is connected by belt means 256 to a sheave 258 that is journalled on an arm 260 (FIGS. 1 and 23). The arm 260 is pivotally mounted on the countershaft 250 and carries a pinion 262 that is unitary with the sheave 258 and that meshes with a second pinion 264 on the countershaft 250. The arm 260 may be swung in an arc about the axis of the countershaft 250 for the purpose of tightening the belt means 256. In the construction shown, the lower end of arm 260 is pivotally connected to an adjustment link 265 that is longitudinally slotted for engagement by a cap screw 266 in a fixed bracket 268.

Referring to FIGS. 16 and 22, the grill 110 is carried by a drain pan 270 that discharges into the juice-collecting bowl 48 and the upper rear end of the drain pan 270 which movably rests on a roller 272 on a cross rod 273. The lower end of the drain pan 270 has a longitudinally extending pair of bars 274 that slidingly engage corresponding fixed guide sleeves 275. The two side bars 274 have downwardly extending webs 276 which form shoulders 278 that are perpendicular to the grill and abut corresponding cams 280 on the countershaft 250. Since the drain pan 270 that carries the grill 110 is free to move in its plane and gravitates against the two cams 280, the rotation of the two cams continually kicks the drain pan upwardly and rearwardly for rapid reciprocation of the grill in its plane to encourage gravitational travel of peel thereon downward towards the reversely rotating fluted roller 112.

A spray system is built into the apparatus to permit the apparatus to be cleaned while it is operating at full speed. For this purpose, the various tubular legs 70 that support the inner ring-shaped support plate 66 are provided with suitable jets to spray the parts of the apparatus that are exposed to the extracted juice. Thus, FIG. 9 shows how a tubular leg 70 may be provided with spray jets 281. FIG. 1 shows how a flexible hose 282 may be connected to each of the tubular legs 70 to supply pressurized water thereto. FIG. 26 shows how the angular bracket 142 that carries the downwardly extending plate 140 may be of tubular construction and may be equipped with spray nozzles 284. A conduit 285 is connected to the lower end of the tubular bracket 142 to supply the pressurized water.

It is apparent that the apparatus is compact and is of relatively simple construction, the principal moving parts being the annular carousel and the reamer assembly. The cup rate of the initial embodiment of the apparatus is approximately 750 per minute and the described arrangement for feeding the fruit to the cups results in a production rate that is at least 95 percent of the cup rate or approximately 700 per minute.

Maintenance of the apparatus is simplified by the fact that each of the cups 34, 36 may be readily removed and replaced and each of the reamer units 40 may be readily removed and replaced. Different sets of cups and reamer units may be used interchangeably for runs of different sizes of fruit and the reamer assembly may be readily adjusted relative to the annular carousel for different thicknesses of the fruit skins.

The description in specific detail of the selected embodiment of the invention will suggest various changes, substitutions and other departures from the disclosure within the spirit and scope of the appended claims.

We claim:

1. An apparatus for extracting juice from citrus fruit, comprising the combination of:
   an annular carousel having a continuous circumferential series of cup means to hold halves of citrus fruit;
   a rotary reamer assembly of a diameter substantially smaller than the inside diameter of the annular carousel, said reamer assembly being positioned inside the annular carousel in tangential relation with the inner circumferential region of the annular carousel,
   said assembly having a circumferential series of radially positioned reamer elements synchronized with the cup means to cooperate with the cup means to extract juice from the halves of citrus fruit therein; and
   means to provide the cup means with halves of citrus fruit for processing by the reamer elements and to remove reamed fruit skins from the cup means after the reaming operation.

2. A combination as set forth in claim 1 in which the reamer assembly is movable towards and away from the surrounding annular carousel for adjustment of the clearance between the reamer elements and the cups in the reaming operation to accommodate a range of thicknesses of the skins of different runs of fruit.

3. A combination as set forth in claim 1 including means connecting the rotary reamer assembly with the annular carousel to synchronize the reamer assembly with the annular carousel.

4. A combination as set forth in claim 1 which includes power means to drive the rotary assembly and in which the rotary assembly drives the annular carousel.

5. A combination as set forth in claim 4 in which the annular carousel has a circumferential series of projections;
   in which the reamer assembly has a circumferential series of radially positioned fork elements to straddle said projections sequentially to drive the annular carousel;
   and in which the projections and the fork elements are shaped, dimensioned and spaced for two fork elements to engage two of the projections simultaneously from opposite sides of the projections to minimize backlash between the rotary reamer assembly and the annular carousel.

6. A combination as set forth in claim 5
   in which the reamer assembly is movable towards and away from the surrounding annular carousel for adjustment of the clearance between the reamer elements and the cup means to accommodate a range of thicknesses of the fruit skins;
   in which the effective depth of the fork elements measured radially of the rotary reamer assembly is sufficient to permit adjustment of the clearance between the reamer elements and the cup means in the reaming operation;
   and in which the fork elements are shaped and dimensioned to maintain effective contact with the pairs of projections to effectively resist backlash throughout the range of adjustment of the reamer assembly.

7. A combination as set forth in claim 1 which includes:
   means mechanically responsive to rotation of the annular carousel to slice the citrus fruit in halves; and
   means mechanically responsive to rotation of the annular carousel to operate the cup means through a cycle of operation to receive new fruit, to cooperate with said slicing means, and to cooperate with the reamer assembly to ream the fruit halves.

8. A combination as set forth in claim 1 in which the reamer assembly and the annular carousel define a space that is crescent-shaped in plan, and including a mechanism in said space operative for the various purposes of loading the cup means with new fruit, cooperating with the cup means to slice the fruit, positioning the cup means for cooperation with the reamer elements to ream the fruit halves, and to remove reamed fruit skins from the cup means.

9. A combination as set forth in claim 1
which includes fixed knife means to cut the fruit into halves;
and in which said series of cup means comprises a series of pairs of cups with the cups of each pair pivotally interconnected,
each of said pairs of cups being operative to fold and unfold through a cycle of positions including a partially folded position to receive new fruit, a fully folded position to captivate the new fruit to cooperate with the knife means to sever the new fruit into halves and unfolded positions to present the fruit halves to the reamer elements.

10. A combination as set forth in claim 9,
in which each pair of cups comprises an upper cup and a lower cup hingedly mounted below the upper cup;
in which the upper cup is fixedly mounted on the annular carousel with the upper cup facing radially inwardly of the annular carousel;
which includes means mechanically responsive to rotation of the annular carousel to actuate the lower cup to position the lower cup in upwardly facing attitude to receive a new fruit, to close the lower cup towards the upper cup to retain the fruit for the slicing operation and to drop the lower cup to a radially inwardly facing position for cooperation with the reamer elements;
and which includes retainer means to keep the fruit halves from falling out of the cups in the time interval between the slicing of the fruit and the reaming of the fruit halves.

11. A combination as set forth in claim 10 in which said retainer means includes a fixed member extending across the open side of the upper cup,
said fixed member being curved to conform to the curved path of travel of the upper cup and extending in a direction of rotation of the annular carousel from the region of said fixed knife means towards the region of the reaming operation.

12. A combination as set forth in claim 11 in which said retainer means includes a fixed barrier extending from the region of the fixed knife means in a direction of rotation of the carousel,
said fixed barrier conforming to the resultant path of the arcuate travel of the lower cup with the carousel and the rotation of the lower cup relative to the upper cup to retain a fruit half in the lower cup in the time interval between the slicing of a fruit and the reaming of the two halves of the sliced fruit by the reamer elements.

13. A combination as set forth in claim 12,
which includes a zone spaced from the region of the reaming operation in the direction of rotation of the annular carousel;
which includes means at said zone to eject reamed fruit skins from the pairs of cups;
and which includes retainer means to keep the reamed fruit skins in the cups until the cups reach said zone.

14. A combination as set forth in claim 10 in which the means to actuate the lower cup of each pair of cups comprises a fixed cam extending along the path of arcuate travel of the lower cup and follower means that is controlled by the cam and is operatively connected to the lower cup.

15. A combination as set forth in claim 14 in which said cam includes an elongate member of irregular shape that extends around the axis of rotation of the annular carousel,
said cam member having a portion of semicircular radial cross sectional configuration with a radius of curvature substantially equal to the distance of the cam from the axis of the hinge of the lower cup.

16. A combination as set forth in claim 14 in which said follower movably embraces the cam member and is pivotally mounted on the lower cup to pivot to follow changes in direction of the cam.

17. A combination as set forth in claim 16 in which the follower comprises a pair of grooved rollers;
in which the pair of rollers is carried by a spindle;
and in which the spindle is rotatably mounted on the lower cup.

18. A combination as set forth in claim 1
in which the cup means comprises a pair of cups to hold a pair of fruit halves;
and which includes means to eject a reamed fruit skin from each cup;
in which each cup is slotted to clear said ejecting means;
and in which the ejecting means includes a fixed member in the path of travel of the cup to cam a reamed fruit skin from the cup.

19. A combination as set forth in claim 18 which includes a fixed knife in the path of ejection of the reamed fruit skin to bisect the reamed fruit skin.

20. A combination as set forth in claim 19 in which the fixed knife is fixedly mounted on said fixed member that cams the reamed fruit skin out of the cup.

21. A combination as set forth in claim 18
which includes a grill to receive the ejected reamed skins;
in which the grill is inclined to discharge the reamed skins by gravity;
and which includes means to agitate the inclined grill to promote gravitational travel of the reamed skins along the grill.

22. A combination as set forth in claim 21 which includes:
a roller positioned at the lower end of the inclined grill with the axis of the roller perpendicular to the direction of gravitational travel of the reamed fruit skins;
and means to rotate the roller in a rotary direction for causing the upper peripheral surface of the roller to travel counter to the gravitational travel of the reamed fruit skins,
the peripheral surface of the roller being characterized by shoulders to engage free membranes of the reamed fruit and to divert the free membranes from the path of discharge of the reamed fruit skins for recovery of fruit juice that clings to the free membranes.

23. A combination as set forth in claim 22 in which the means to agitate the grill includes a rotary cam to reciprocate the grill, said cam being united with said roller for rotation therewith.

24. A combination as set forth in claim 1 in which the annular carousel has three levels comprising: a lower level occupied by the cup means; an intermediate level occupied by a circumferential series of upright magazines to feed fruit to the cup means, respectively, each magazine being capable of holding an upright row of at least two fruit; and an upper level in the form of a hopper to feed fruit to the upright magazines.

25. A combination as set forth in claim 24 in which said hopper has a bottom wall within the area defined by the circular path of the magazines, said bottom wall being of conical configuration and sloping radially outwardly and downwardly towards the magazines so that both gravity and centrifugal force urge the fruit radially outward to the travelling magazines.

26. A combination as set forth in claim 24 including means removably mounting the structure of at least the upper two levels of the carousel for access to the interior of the apparatus.

27. A combination as set forth in claim 24 in which the structure of the upper two levels of the carousel is releasably attached to the lower level of the carousel that carries the cup means so that removal of the structure of the upper two levels of the carousel exposes the interior of the apparatus including the series of cup means.

28. A combination as set forth in claim 24 in which the intermediate level of the annular carousel is provided with a circumferential series of guides to receive fruit released by the corresponding magazines and to direct the released fruit to the cup means on the lower level of the annular carousel;
    in which a fixed concentric cam is positioned inside the inner circumference of the carousel on the intermediate level of the carousel;
    in which the fruit guides are slidably mounted on corresponding vertical bars of the carousel;
    in which each fruit guide is provided with a follower controlled by the concentric cam to temporarily lower the fruit guides successively at a loading zone in the revolution of the carousel;
    which includes fixed support structure inside the inner circumference of the carousel;
    in which said concentric cam is releasably mounted on said fixed support structure;
    and in which said concentric cam is removable with the structure of the upper two levels of the carousel.

29. A combination as set forth in claim 24 in which the magazines and the cup means travel through a loading zone;
    in which means at the loading zone responsive to rotation of the carousel cooperates with the travelling magazines to transfer fruit from the magazines to the cup means.

30. A combination as set forth in claim 29 in which the magazines have lower openings for discharge of fruit therefrom;
    which includes fixed means at the loading station to eject fruit from the successive magazines to permit the ejected fruit to gravitate into the cup means, said magazines having slots to clear said fixed means.

31. A combination as set forth in claim 30 which includes a series of vertically elongated guides carried by the carousel to guide the fruit as it gravitates to the cup means.

32. A combination as set forth in claim 31 in which each of the guide means is normally at the intermediate level of the annular carousel; and which includes means to lower the guide means temporarily as the guide means reach said loading zone.

33. A combination as set forth in claim 32 which includes a fixed cam extending circumferentially of the annular carousel concentric to the axis of rotation of the carousel;
    and in which each guide means is equipped with a follower controlled by the cam, the cam having a downward offset in the region of said loading station.

34. A combination as set forth in claim 1 in which each cup means comprises an upper cup and a lower cup paired therewith;
    in which the rotary reamer assembly includes an upper circumferential row and a lower circumferential row of radially outwardly extending reamer units to cooperate with the pairs of cups;
    in which the two circumferential rows of reamer units are journalled in structure on the upper end of an outer tubular shaft;
    in which each reamer element is driven by a corresponding gear positioned radially inwardly from the reamer element, there being upper and lower circumferential rows of the gears;
    in which an upright inner shaft inside the tubular shaft carries two gears in mesh respectively with the upper and lower circumferential rows of gears of the reamer units;
    and which includes drive means for independent actuation of the outer and inner shafts.

35. A combination as set forth in claim 34 in which a downwardly facing gear is unitary with the lower end of the outer shaft;
    in which a downwardly facing gear is unitary with the lower end of the inner shaft;
    in which a drive shaft below the two downwardly facing gears is positioned radially of the axis of the outer shaft;
    and in which said drive shaft carries two gears in mesh respectively with the two downwardly facing gears.

36. A combination as set forth in claim 1 in which said series of cup means comprises a series of upper cups and a series of lower cups paired therewith to carry halves of fruit past the rotary reamer assembly and beyond to a station for ejection of the reamed fruit skins from the cups;
    in which the cups are formed with transverse slots extending inwardly from the rims of the cups with the slots aligned with the direction of travel of the cups;
    and in which fixed ejector means is positioned in the path of travel of the cups in alignment with the slots of the cups to engage the backs of the reamed fruit skins and to cam the reamed fruit skins out of the cups.

37. A combination as set forth in claim 36 which includes knife means in the path of ejection of the reamed fruit skins from the cups to bisect the reamed fruit skins.

38. A combination as set forth in claim 1 in which the structure of the annular carousel includes a circumferential ring;
    and in which fixed bearing shoes spaced around the circumference of the annular carousel slidingly engage the ring to rotatably support the annular carousel.

39. In an apparatus for extracting juice from citrus fruit, the combination of:
  a power-actuated structure rotatable on an upright axis;
  a circumferential series of upright magazines on the structure open at their upper ends to receive citrus fruit, each magazine having a capacity of at least two fruit in generally vertical alignment;
  a hopper above the open tops of the magazines to hold a supply mass of fruit, said hopper having an annular bottom opening extending along the circumferential path of travel of the magazines to permit the fruit to drop into the magazines;
  an operating zone below the level of the travelling magazines;
  means to transfer the fruit from the bottoms of the magazines sequentially to said operating zone;
  means in the operating zone to cut the fruit into halves;
  means in the operating zone to ream the cut halves of fruit; and
  means in the operating zone to discard the skins of the reamed fruit.

40. A combination as set forth in claim 39 in which said hopper is of circular configuration and the hopper has a conical bottom to urge the fruit gravitationally radially outwardly to the travelling magazines.

41. A combination as set forth in claim 39 in which the hopper rotates with said structure to urge the fruit centrifugally radially outwardly to the travelling magazines.

42. A combination as set forth in claim 41 which includes fixed means above the path of travel of the upper ends of the magazines to impede fruit above the magazines that tend to travel with the magazines and thereby encourage such fruit to drop into the travelling magazines.

43. In an apparatus for extracting juice from citrus fruit, the combination of:
  a first rotary structure having an axis of rotation;
  a circumferential series of pairs of cups on the first rotary structure movable about said axis of rotation to carry the fruit through a reaming zone;
  a second rotary structure having an axis of rotation and being positioned in tangential relation to the first rotary structure at said reaming zone;
  a circumferential series of pairs of reamer elements on the second structure movable about its axis of rotation to enter said pairs of cups in the reaming zone,
  said pairs of cups being operable through a cycle of positions including a loading position to receive new fruit, a closed position to retain the fruit for a slicing operation to cut the fruit into halves and a position with both cups facing the reaming zone for cooperation with said reamer elements;
  means cooperative with the closed cups to cut the fruit into halves;
  means to remove the reamed fruit skins from the cups; and
  means to collect the fruit juice released by the reaming operation.

44. A combination as set forth in claim 43,
  in which each pair of cups comprises a fixed upper cup and a pivoted lower cup;
  in which the upper cup is positioned to face the reaming zone;
  which includes a fixed cam to swing the lower cup of each pair through a sequence of positions including a position to face the reaming zone, an intermediate upright loaded position to receive new fruit and an upper position closed against the upper cup to captivate a newly loaded fruit;
  and in which each lower cup is equipped with follower means engaged with the fixed cam.

45. A combination as set forth in claim 44 in which said follower means is rotatably mounted on the lower cup to follow changes in direction of the cam.

46. In an apparatus for extracting juice from citrus fruit wherein cups with fruit halves therein travel in a closed path from a reaming zone through a zone to remove the reamed skins of fruit halves from the cups,
  the improvement for removal of the reamed skins of fruit halves from the cups comprising:
  the cups being formed with transverse slots extending inwardly from the rims of the cups with the slots aligned with the direction of travel of the cups;
  a fixed knife adjacent the path of travel of the cups positioned in alignment with the path of travel and in alignment with the slots of the cups with its cutting edge positioned across the open sides of the travelling cups to initially function to retain the reamed skins momentarily in the travelling cups; and
  fixed ejector means positioned in the path of travel of the cups in alignment with the slots of the cups to engage the backs of the reamed fruit skins and to cam the reamed fruit skins out of the cups past the cutting edge of the knife to eject the reamed skins from the cups and simultaneously to bisect the reamed skins.

47. In an apparatus for extracting juice from citrus fruit, the combination of:
  a rotary annular carousel having a continuous circumferential series of cup means to hold citrus fruit;
  a circumferential series of magazines on the carousel corresponding to the series of cup means to supply fruit to the cup means,
  said cup means and magazines travelling with the carousel through a loading station;
  a hopper on the carousel to hold bulk fruit to supply the magazines;
  means synchronized with the carousel to transfer fruit from the magazines to the corresponding cup means at said loading station;
  means to slice the fruit into halves;
  means synchronized with the carousel to operate the cup means through a cycle of operation to cause the cup means to receive new fruit from the magazines and to cause the cup means to cooperate with said slicing means; and
  means cooperative with the cup means to ream the fruit halves.

48. A combination as set forth in claim 47
  which includes fixed knife means to cut the fruit into halves;
  and in which said series of cup means comprises a series of pairs of upper and lower cups with the cups of each pair pivotally interconnected,
  each of said pairs of cups being operative to fold and unfold through a cycle of positions including fully folded positions to captivate fruit to cooperate with the slicing means and unfolded positions to present the fruit halves to the reamer means.

49. A combination as set forth in claim 48 in which the upper cups are fixedly mounted on the annular carousel with the upper cups facing radially inwardly of the annular carousel;

and which includes means mechanically responsive to rotation of the annular carousel to lower the lower cups away from the upper cups to expose the pair of cups for the reception of new fruit and to close the lower cups towards the upper cups to cooperate therewith to captivate the fruit for cooperation with the slicing means and subsequently to lower the lower cups for cooperation of both cups with the reamer means.

50. A combination as set forth in claim 49 which includes retainer means to keep the fruit halves from falling out of the cups in the time interval between the slicing of the fruit and the reaming of the fruit halves, said retainer means including a fixed member positioned to extend across the open sides of the travelling upper cups, said fixed member being curved to conform to the curved path of travel of the upper cups and extending in a direction of rotation of the annular carousel from the region of said slicing means towards the region of said reaming means.

51. A combination as set forth in claim 50 in which said retainer means includes a fixed barrier extending from the region of the slicing means in the direction of rotation of the carousel, said fixed barrier conforming to the resultant path of the arcuate travel of the lower cups with the carousel and the rotation of the lower cups relative to the upper cups to retain fruit halves in the lower cups in the time interval between the slicing of a fruit and the reaming of the two halves of the sliced fruit.

52. A combination as set forth in claim 51 which includes means spaced from the region of the reaming operation in the direction of rotation of the annular carousel to eject reamed fruit skins from the pairs of cups;

and which includes retainer means to keep the reamed fruit skins in the cups until the cups reach said ejecting means.

53. A combination as set forth in claim 47 in which the annular carousel has three levels comprising: a lower level occupied by the series of cup means; an intermediate level occupied by a corresponding series of upright magazines; and an upper level in the form of a hopper to feed fruit to the magazines.

54. A combination as set forth in claim 53 in which the annular carousel is provided with a circumferential series of transfer means to receive fruit released by the corresponding magazines and to direct the released fruit to the cup means on the lower level of the annular carousel;

in which a fixed continuous cam means is positioned near the inner circumference of the carousel on the intermediate level of the carousel;

in which said transfer means are movably mounted on the carousel;

and in which each transfer means is provided with a follower controlled by said continuous cam to temporarily lower the transfer means successively at said loading station in the revolution of the carousel.

55. A combination as set forth in claim 54 which includes fixed support structure inside the inner circumference of the carousel;

in which said continuous cam means is releasably mounted on said fixed support structure;

and in which said continuous cam means is removable with the structure of the upper two levels of the carousel.

56. A combination as set forth in claim 47 in which the magazines have lower openings for discharge of fruit therefrom;

and which includes fixed cam means to eject fruit from the successive travelling magazines at the loading zone to permit the ejected fruit to gravitate towards the cup means, said magazines forming slots to clear said fixed cam means.

57. In an apparatus for slicing citrus fruit in halves and reaming the halves to extract juice, the improvement comprising:

a continuous series of pairs of cups; and means to carry the pairs of cups along a continuous circular path through a loading zone, a slicing zone, and a reaming zone with both cups of each pair facing inwardly of the circular path as the cups approach and leave the reaming zone to cause centrifugal force to tend to keep the fruit halves in the cups as they approach the reaming zone.

* * * * *